United States Patent
Kawano et al.

(10) Patent No.: US 8,228,566 B2
(45) Date of Patent: Jul. 24, 2012

(54) IMAGE READING APPARATUS

(75) Inventors: Hiroyuki Kawano, Tokyo (JP); Tatsuki Okamoto, Tokyo (JP); Tadashi Minobe, Tokyo (JP); Tatsuya Kunieda, Tokyo (JP); Akiko Fujiuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/921,632

(22) PCT Filed: Mar. 31, 2008

(86) PCT No.: PCT/JP2008/056301
§ 371 (c)(1),
(2), (4) Date: Sep. 9, 2010

(87) PCT Pub. No.: WO2009/122483
PCT Pub. Date: Oct. 8, 2009

(65) Prior Publication Data
US 2011/0038019 A1  Feb. 17, 2011

(51) Int. Cl.
*H04N 1/04* (2006.01)
*H04N 1/46* (2006.01)

(52) U.S. Cl. ........ 358/474; 358/475; 358/483; 358/482; 358/505; 358/509; 358/512; 358/513; 358/514

(58) Field of Classification Search ............... 358/475, 358/483, 482, 450, 474, 497, 487, 505, 509, 358/506, 512–514; 250/208.1, 216, 239
See application file for complete search history.

(56) References Cited

U.S. PATENT DOCUMENTS

| | | | |
|---|---|---|---|
| 4,509,826 A | | 4/1985 | Araghi |
| 4,512,632 A | | 4/1985 | Tokumitsu et al. |
| 4,623,937 A | * | 11/1986 | Watanabe ............. 358/483 |
| 4,742,240 A | * | 5/1988 | Yamanishi et al. ...... 358/300 |
| 5,187,358 A | * | 2/1993 | Setani ............... 250/208.1 |
| 5,270,840 A | * | 12/1993 | Ogata et al. ........... 358/482 |

(Continued)

FOREIGN PATENT DOCUMENTS

JP     50 74948     6/1975

(Continued)

OTHER PUBLICATIONS

Japanese Office Action issued Nov. 8, 2011 in patent application No. 2010-505144.

(Continued)

*Primary Examiner* — Cheukfan Lee
(74) *Attorney, Agent, or Firm* — Oblon, Spivak, McClelland, Maier & Neustadt, L.L.P.

(57) ABSTRACT

An image reading apparatus includes a light source, an imaging optics system, an image pickup device unit, a memory, and a processor. The imaging optics system condenses scattered light reflected on an object to be imaged to form condensed light as an image. The imaging optics system includes plural cells arranged in a main scanning direction and each of which is an independent imaging optics system. Each of the cells includes a telecentric optics system at the document side. Two rows of cells are arranged in a sub-scanning direction. The cells in the rows are arranged zigzag in the main scanning direction to complement a formed image by the cells in the sub-scanning direction. The image pickup device unit is arranged to correspond to each cell. The processor can form a document image by reconstructing and combining image information stored in the memory into an image.

11 Claims, 30 Drawing Sheets

U.S. PATENT DOCUMENTS

| | | | |
|---|---|---|---|
| 5,489,993 A | * | 2/1996 | Ito et al. .................. 358/482 |
| 5,985,491 A | | 11/1999 | Kim et al. |
| 7,884,976 B2 | * | 2/2011 | Minobe et al. .............. 358/483 |

FOREIGN PATENT DOCUMENTS

| JP | 56 146355 | 11/1981 |
|---|---|---|
| JP | 57-201215 | 12/1982 |
| JP | 59 105762 | 6/1984 |
| JP | 60 74869 | 4/1985 |
| JP | 4 138766 | 5/1992 |
| JP | 5 14600 | 1/1993 |
| JP | 5 224005 | 9/1993 |
| JP | 8 204899 | 8/1996 |
| JP | 9 127319 | 5/1997 |
| JP | 9-247386 | 9/1997 |
| JP | 10 308852 | 11/1998 |
| JP | 11 8742 | 1/1999 |
| JP | 2005 37448 | 2/2005 |

OTHER PUBLICATIONS

European Search Report issued Jan. 27, 2012 in Application No. 08739415.

* cited by examiner

IMAGE READING APPARATUS

TECHNICAL FIELD

The present invention relates to an image reading apparatus used in a copier and the like.

BACKGROUND ART

There are broadly two types of image reading apparatuses, used in copiers, scanners, facsimiles, and the like, for reading the entire image by scanning an image at a reading position using a one-dimensional image pickup device. It should be noted that, in general, a direction in which one-dimensional image pickup devices are arranged is referred to as a main scanning direction, and a direction in which scanning is performed is referred to as sub-scanning direction.

In one of the two types, a single-eye lens is used to reduce and transfer the entire image in the main scanning direction onto image pickup devices. This system is mainly used by a copier to read the front side. In this system, the image pickup devices and the lens located at the side of a document are usually fixed, and only a mirror moves in the sub-scanning direction so as to scan the entire document. In this system, the depth of focus (or the depth of field) at the side of the document is rather large in the order of several millimeters, for example, 6 mm. Therefore, this system has an advantage in that the document can be read even when the document is not in close contact with the reading surface for the document of the copier. For example, even when a gutter of a bound book cannot come into contact with the reading surface for the document, this system has an advantage in that the document can be read without any defocus. Therefore, this system has been mainly used by copiers to read the front side. There are various patent documents derived from this method. For example, Patent Document 1 is listed below (hereinafter referred to as conventional method 1).

In the other of the two types, an image in the main scanning direction is divided into a plurality of parts and read by a compound-eye lens. This is usually called as a contact image sensor. This system is used by a copier which reads the back side, a facsimile machine which reads a document, a banknote recognition sensor, a scanner for personal computer, and the like, and is characterized by its small size. For example, Patent Document 2 discloses a conventional technique which has now become a mainstream of an optics system for this contact image sensor. Patent Document 2 discloses an image reading apparatus for obtaining an erect same-magnification-rate image by using a compound-eye lens ("rod lens array" in Patent Document 2) in which a plurality of rod lenses each having a distribution of refractive index defined by a certain function in a radius direction are arranged in a state of array (hereinafter referred to as conventional method 2).

Another typical exemplary system of optics system for the contact image sensor is, for example, a system disclosed in Patent Document 3. In this system, lenses are arranged respectively for cells divided in the main scanning direction, and images in regions respectively corresponding to the cells are reduced and transferred by the lenses onto image pickup devices so as to form images thereon. The output signals provided by the image pickup devices respectively arranged for the cells are combined into an image so as to restore the image existing on the document surface (hereinafter referred to as conventional method 3).

Patent Document 4 is similar to the above conventional method 2 or the above conventional method 3, and discloses a method for obtaining an erect same-magnification-rate image by using a compound-eye mirror lens array (hereinafter referred to as conventional method 4).

Patent Document 5 discloses a method for obtaining an erect same-magnification-rate image on an imaging plane, wherein a reading region is divided into odd-number regions and even-number regions, and an optical path of an imaging optics system is changed according to whether a region is an odd-number region or an even-number region, and wherein the imaging optics system is telecentric (hereinafter referred to as conventional method 5).

Patent Document 1: Japanese Patent Laid-Open No. H10-308852
Patent Document 2: Japanese Patent Laid-Open No. H8-204899
Patent Document 3: Japanese Patent Laid-Open No. H5-14600
Patent Document 4: Japanese Patent Laid-Open No. H11-8742
Patent Document 5: Japanese Patent Laid-Open No. 2005-37448

DISCLOSURE OF THE INVENTION

Problems to be Solved by the Invention

The conventional method 1 has an advantage in that the depth of field is large as explained above, but has a problem in that the optics system is getting large. In addition, the conventional method 1 has further problems in that it is necessary to control a moving speed of multiple mirrors arranged in an optical path extending from the reading surface for the document to a lens in order to prevent the change of the optical path when the mirrors move, and accordingly the cost increases due to this control.

The conventional method 2 has an advantage in being small and inexpensive, but has problems in that the depth of field is small and the chromatic aberration is large.

The conventional method 3 has problems in that when the depth of field is increased, the apparatus becomes larger, and the chromatic aberration becomes larger. In the conventional method 3, since the transfer magnification changes depending on the depth of field, when the images taken in respective imaging optics systems are combined, displacement may occur in the overlapping process of the images. Therefore, it is difficult to increase the depth of field.

The conventional method 4 has an effect of eliminating chromatic aberration because a mirror array having a plurality of concave mirrors is used as an imaging optics element. However, the patent document 4 does not describe the detailed arrangement of a diaphragm 17, a first mirror array 13, and a first mirror array 14. Therefore, when a document 10 is far away from contact glass 12, the transfer magnification of the transferred image is considered to change. As a result, images adjacent to each other may overlap in different manners, and an image on an array boundary surface is considered to deteriorate, which makes it difficult to obtain a large depth of field.

In the conventional method 5, an image of a linear object 10 is read from oblique directions by odd-number region imaging systems 11 to 41 and even-number region imaging systems 12 to 42. Accordingly, there is a problem in that when the position of the object 10 changes in a focus direction, the reading position changes between the odd-number regions and the even-number regions, which displaces the images of them both from each other on a photosensitive medium 60 serving an image-forming surface. Moreover, the patent document 5 does not describe specific arrangement and effects of telecentric imaging system in the specification. When the position of the object 10 changes in the focus direction, the transfer magnification is considered to change at the focal position. Accordingly, the images overlap in different manners between m-th imaging systems and (m+1)-th imaging systems (m is an integer), thereby making the image deteriorate. Due to the above two problems, it is difficult to obtain a large depth of field in the conventional method 5.

The present invention is made to solve the above-described problems, and it is an object of the present invention to provide a small image reading apparatus having a large depth of field.

Means for Solving the Problem

In order to achieve the above object, the present invention is configured as follows.

That is, an image reading apparatus according to a first aspect of the present invention is characterized by comprising: a light source configured to apply light to a section to be imaged of a document; an imaging optics system configured to form an image upon condensing scattered light of the light reflected by the section, the imaging optics system including a plurality of cells which are arranged in a main scanning direction, each of which is independent from each other and has telecentric optics system at the side of the document, wherein the cells are arranged in a sub-scanning direction in two rows of a first row and a second row, and are arranged such that light beams among chief rays of the cells arranged in a same row, light beams being directed from the document to the cells, are in parallel with each other, and wherein the cells in the first row and the second row are arranged zigzag in the main scanning direction so as to complement a formed image by the cells in the sub-scanning direction; a plurality of image pickup device units arranged to correspond to the respective cells; a memory configured to store image information transmitted from image pickup device units corresponding in the sub-scanning direction; and a processor configured to create a document image by reconstructing and combining the image information stored in the memory into an image.

In the image reading apparatus, the cells arranged in the first row and the second row may be arranged such that the light beams among the chief rays of the cells arranged in the first row, light beams being directed from the document to the cells, and the light beams among the chief rays of the cells arranged in the second row, light beams being directed from the document to the cells, are inclined toward a gap side between the first row and the second row.

The image reading apparatus may further include a bending mirror arranged between the document and the cell so as to bend an optical path of the scattered light incident to the cell.

In the image reading apparatus, the bending mirror may include a first bending mirror corresponding to the cells in the first row and a second bending mirror corresponding to the cells in the second row, the first bending mirror and the second bending mirror being arranged along the main scanning direction at different positions in the sub-scanning direction.

In the image reading apparatus, the bending mirror may include a first reflective surface corresponding to the cells in the first row and a second reflective surface corresponding to the cells in the second row, the first reflective surface and the second reflective surface being arranged along the main scanning direction at one position in the sub-scanning direction.

In the image reading apparatus, the cell may include a first optical element into which the scattered light enters from the document and a second optical element which outputs light to the image pickup device unit, at least one of the first optical element and the second optical element being a reflective light-gathering element.

In the image reading apparatus, the cell may further include a diaphragm which is arranged at a back focal point position of the first optical element and causes the cell to be a telecentric optics system at the side of the document, a light-transmitting region of the diaphragm being made of a mirror.

In the image reading apparatus, a transfer magnification of each cell may be 1.

Advantages of the Invention

The image reading apparatus according to one aspect of the present invention includes a light source for applying light onto a document, a plurality of cells arranged in a main scanning direction and arranged in two rows in a sub-scanning direction, the cell forming a telecentric imaging optics system at the side of the document, an image pickup device, a memory for temporarily storing image information, and a processor for reconstructing the image information stored in the memory. With this configuration, the reading region of the document in the main scanning direction is divided, and the plurality of cells read the image of the reading region. Accordingly, the size of the image reading apparatus can be reduced. Further, the cells are arranged in two rows in the sub-scanning direction, and images are obtained from the cells arranged in the rows. Accordingly, the images between the cells can be complemented without causing deterioration of the images obtained from the cells arranged in the main scanning direction. Therefore, a high quality image can be obtained. Further, each cell has the telecentric optics system at the side of the document, so that a subject distance can be increased.

More specifically, since each cell has the telecentric optics system at the side of the document, there is an advantage in that even when the document moves in a focus direction, the transfer magnification of the image does not change. Further, since each cell has the telecentric optics system at the side of the document, the chief ray in the pencil of rays directed from a point (this is called a point E) in proximity to an end of the image range read by a cell to an entrance pupil of the cell is in parallel with the optical axis. Therefore, a lens having a larger aperture than the reading range of the document is necessary in order for all of the pencil of rays directed from the point E to enter into the optics system of the cell without causing vignetting. When the cells are arranged in one row in the sub-scanning direction and arranged adjacent to each other in main scanning direction, a blank is formed in the reading range at a boundary section between the cells. On the contrary, when the aperture of the lens matches a reading width of one cell, there is a problem in that vignetting is caused in the pencil of rays directed from the point E.

For this problem, the image reading apparatus according to one aspect of the present invention has two rows of cells in the sub-scanning direction. For the sake of easy understanding, the cells are numbered. Of the two rows of cells arranged in the sub-scanning direction, the cells in the first row are numbered as n=1, 3, 5, . . . , and the cells in the second row are numbered as n=2, 4, 6, . . . . In the image reading apparatus according to one aspect, the aperture of the cell is configured to be larger than the reading range of the cell. With this configuration, even when there is an unreadable blank range between the adjacent cells in the first row, i.e., at the boundary between the k-th cell and the (k+2)-th cell, the image of the blank range is read by the (k+1)-th cell in the second row so as to complement the images.

Since the cells are arranged in two rows as explained above, the cells in the first row and the second row have different reading positions in the sub-scanning direction. Therefore, the image taken by the cell in the first row and the image taken by the cell in the second row at a certain time are different from each other. In order to correct difference of the images, the image reading apparatus according to one aspect of the preset invention employs a method for combining the taken images using the time it takes to scan a distance between the first row and the second row in the sub-scanning direction. In other words, the image reading apparatus according to one aspect includes a memory, and temporarily stores the read images. The image reading apparatus reads, from the memory, two images that were taken by the cells in the first row and the second row at slightly different times, and the image processor reconstructs the image. Therefore, in the image reading apparatus according to one aspect of the present invention, a normal image can be formed from the read image.

Further, as described above, in the image reading apparatus according to one aspect of the present invention, in all the cells included in the first row and the second row, the light beams, among chief rays of all the cells, which are directed from the document to the cells are in parallel. Accordingly, even when a distance between the cell and the document changes, the position of the image with respect to the image pickup device unit does not change. Therefore, a combined image at a boundary section between the k-th cell and the (k+1)-th cell does not deteriorate.

Thus, as described above, in the image reading apparatus according to one aspect of the present invention, the depth of field is large, and the size of the apparatus can be reduced.

Further, in the image reading apparatus according to one aspect of the present invention, since the cells are arranged zigzag, a sufficient gap exists between adjacent cells. Accordingly, shield plates can be arranged without shielding necessary optical paths. In other words, the shield plates can shield the light other than the desired image such as flare and ghost which are generated by stray light, thus providing a clear image.

Further, the cells can be arranged such that the angles of the chief rays reflected by the document are different in the sub-scanning direction between the cells arranged in the first row and the cells arranged in the second row. This arrangement can reduce the gap in the sub-scanning direction between the reading range on the document surface read by the cells in the first row and the reading range on the document surface read by the cells in the second row. Therefore, it is possible to reduce the capacity of the memory storing the read images.

When a bending mirror for bending an optical path is arranged between the document and the cell, the cells can be arranged more freely, and the bending mirror can contribute to reducing the size of the image reading apparatus.

Further, when the bending mirror is arranged at one position in the sub-scanning direction, positional variation of the combined image can be eliminated, and the capacity of the memory can be reduced.

Further, when the element corresponding to the lens in the cell is made of a concave mirror, the space can be saved, and the chromatic aberration can be reduced.

Further, when the light transmission region of the diaphragm of the cell is configured by a mirror, the mirror can further contribute to reducing the size of the image reading apparatus.

Further, when the transfer magnification is set to 1, image pickup devices having an already-available resolution can be used.

DESCRIPTION OF SYMBOLS

Figure 1:
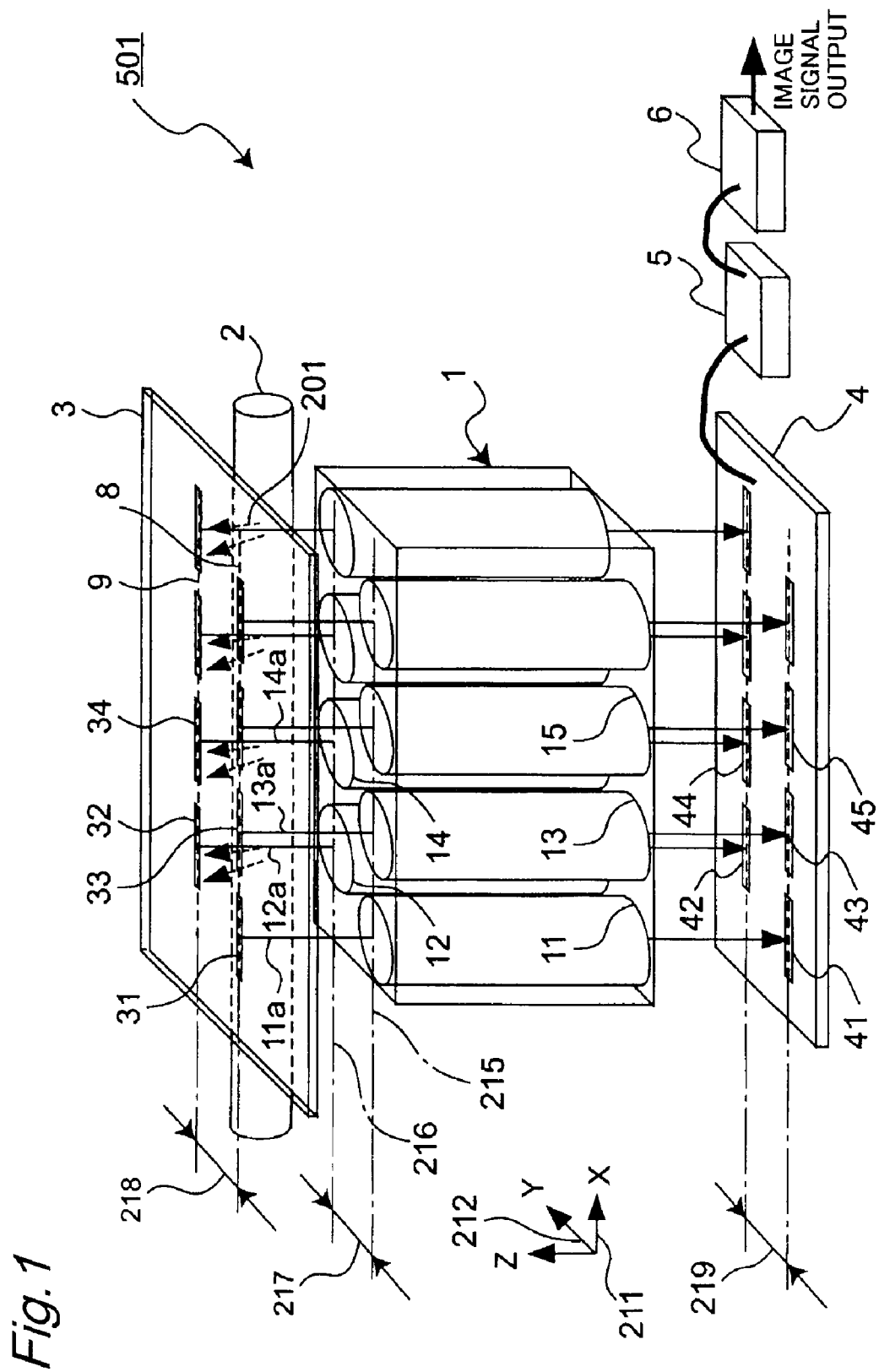
FIG. 1 is a perspective view illustrating a configuration of an image reading apparatus according to the first embodiment of the present inventions.

1 IMAGING OPTICS SYSTEM
2 ILLUMINATION LIGHT SOURCE
3 TOP PANEL
4 SUBSTRATE
5 MEMORY
6 PROCESSOR
7 DOCUMENT
8, 9 READING LINE
11, 12, 13, 14, . . . CELL
31, 32, 33, 34, . . . SECTION TO BE IMAGED
41, 42, 43, 44, . . . IMAGE PICKUP DEVICE UNIT
100 FIRST LENS
101 APERTURE
102 SECOND LENS
111 FIRST BENDING MIRROR
112 SECOND BENDING MIRROR
113 THIRD BENDING MIRROR
126 LIGHT SHIELDING MEMBER
202 SHIELDED LIGHT BEAM
203 DASHED LINE REGION
211 MAIN SCANNING DIRECTION
212 SUB-SCANNING DIRECTION
215 FIRST ROW
216 SECOND ROW
501-507 IMAGE READING APPARATUS

BEST MODE FOR CARRYING OUT THE INVENTION

An image reading apparatus according to an embodiment of the present invention will be hereinafter described with reference to the drawings. In the drawings, the same or similar constituent parts are denoted with the same reference numerals.

First Embodiment

An example of an image reading apparatus according to the first embodiment of this invention will be hereinafter explained with reference to FIG. 1 to FIG. 3.

The image reading apparatus 501 according to the present embodiment mainly includes an imaging optics system 1, a light source 2, image pickup device units 41, 42, . . . , a memory 5, and a processor 6. These constituent parts are arranged as follows. The light source 2 is arranged in proximity to a document 7, i.e., an example of an object from which an image is read. The imaging optics system 1, and the image pickup device unit 41 and the like are arranged such that the light reflected on the document 7 can enter the imaging optics system 1. The image reading apparatus 501 reads the image of the document 7 along a main scanning direction (X-direction) 211, and further scans the document 7 in a sub-scanning direction (Y-direction) 212 perpendicular to the main scanning direction 211, thus reading the entire image of the document 7. It should be noted that the document 7 is an object to be read displaying text, drawings, pictures, and the like, and an object to be read such as a banknote and the like. The document 7 serves as a source of a printed document, used for determining whether it is genuine or not, and used as an electronic file. In FIG. 1, the document 7 is omitted for the sake of clarification of the figure.

The document 7 is placed on a top panel 3, which serves as document holding member. The top panel 3 is made of a transparent material, and is usually a glass plate. The illumination light source 2 is, for example, a fluorescent light and an LED. The illumination light source 2 is arranged at a position below the top panel 3 so as not to hinder reading operation of the document 7. The illumination light source 2 applies an illumination light beam 201 to sections to be imaged 31, 32, . . . arranged at reading positions on the document 7. In FIG. 1, the light source 2 is arranged only on one side of the imaging optics system 1 in a sub-scanning direction 212. However, the arrangement is not limited thereto. It is to be understood that the light sources 2 may be arranged on both sides.

Figure 28:
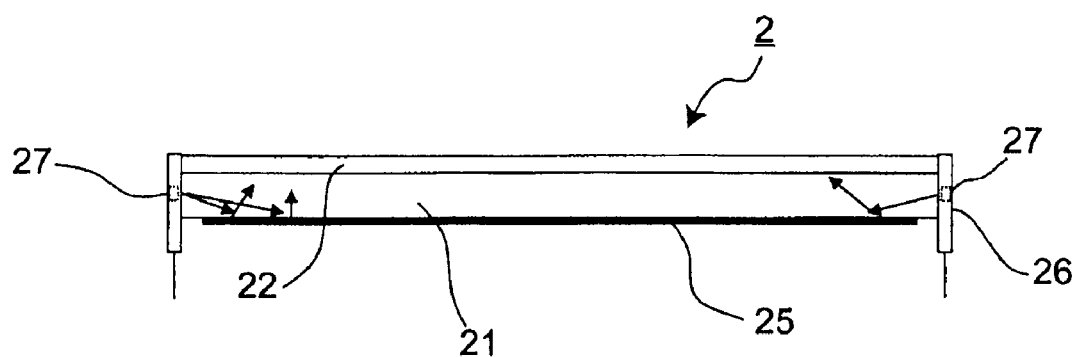
FIG. 28 is a view illustrating a structure of a light source of the first to seventh embodiments.

FIG. 28 illustrates the structure of the light source 2. The light source 2 mainly includes a light guide body 21 having a light output unit 22 and a light-scattering layer 25, electrode units 26, and light emission sources 27. The light guide body 21 is arranged between the electrode units 26 and the light emission sources 27 arranged at respective longitudinal ends of the light source 2.

Figure 29:
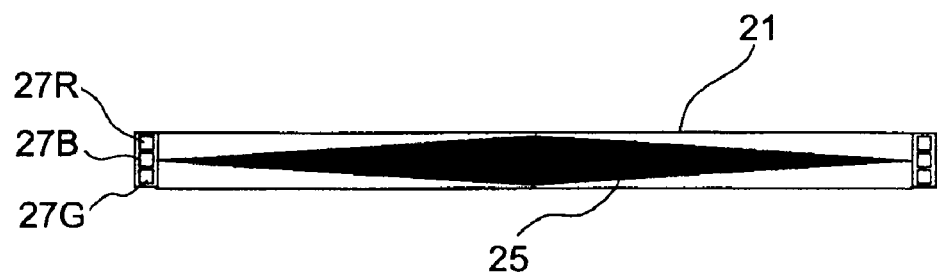
FIG. 29 is a view illustrating the light source shown in FIG. 28.

The light-scattering layer 25 is arranged so as to extend along substantially the entire length of the light guide body 21. With the light-scattering layer 25, the light is uniformly irradiated from the entire light source 2 in the main scanning direction 211 through the light output unit 22 of the light guide body 21. In the present embodiment, the light emission source 27 is made of LED chips respectively emitting red color (R), green color (G), and blue color (B) wavelengths. As shown in FIG. 29, the electrode unit 26 is arranged with a R light source 27R, a B light source 27B, and a G light source 27G.

In order to uniformly emit light from the light output unit 22, the light-scattering layer 25 is formed to be wide in the center thereof in the main scanning direction 211, when the light emission sources 27 are arranged on both ends of the light guide body 21. When the light emission source 27 is arranged on one end of the light guide body 21, the light-scattering layer 25 is formed to be wider at a position away from the light source 27. FIG. 29 shows the light-scattering layer 25 that is formed to be wide in the center thereof in the main scanning direction 211.

The optical wavelengths of the RGB light sources 27 are substantially the same as the wavelengths of RGB colors of RGB filters arranged on a light receiving part 402.

The above-described structure of the light source 2 is the same not only in the image reading apparatus according to the first embodiment but also in the image reading apparatus according to the second to seventh embodiments explained later.

In the drawings, the sections 31, 32, . . . to be imaged are indicated enclosed in a rectangular frame for the sake of easy understanding in terms of explanation and visual appearance. However, the sections 31, 32, . . . actually do not have any structural object of the rectangular frame. For the sake of explanation, a portion in which the sections 31, 33, . . . are arranged along the main scanning direction 211 is defined as a reading line 8, and a portion in which the sections 32, 34, . . . are arranged along the main scanning direction 211 is defined as a reading line 9.

The imaging optics system 1 forms an image by condensing the scattered light of the illumination light beam 201 provided by the light source 2 and reflected by the sections 31, 32, . . . . The imaging optics system 1 has a plurality of cells 11, 12, . . . . Each of the cells 11, 12, . . . is an independent imaging optics system, and has a telecentric optics system at the side of the document 7. The plurality of cells 11, 12, . . . are arranged in the main scanning direction 211. In the sub-scanning direction 212, the cells 11, 12, . . . are arranged in two rows, i.e., a first row 215 and a second row 216. In this example, the cells 11, 13, 15, . . . belong to the first row 215, and the cells 12, 14, . . . belong to the second row 216. The cells in the same row are arranged such that light beams, directed from the document 7 to the cells 11, 12, . . . , among the chief rays in the cells are in parallel with each other. In the example of the present embodiment, optical axes go straight ahead. Therefore, the phrase "light beams, directed from the document 7 to the cells 11, 12, . . . , of the chief rays in the cells" may be paraphrased as "optical axes". In other words, the cells 11, 13, . . . are arranged such that optical axes 11a, 13a, . . . of the cells 11, 13, . . . in the first row are in parallel with each other, and the cells 12, 14, . . . are arranged such that optical axes 12a, 14a, . . . of the cells 12, 14, . . . in the second row are in parallel with each other.

Further, the cells 11, 12, 13, . . . of the first row 215 and the second row 216 are arranged zigzag in the main scanning direction 211 so that formed images can be complemented by between the cells 11 and 12, the cells 12 and 13, the cells 13 and 14, . . . in the sub-scanning direction 212, respectively.

The arrangement and optical paths of elements in the optics system constituting the cells 11, 12, 13, . . . will be explained.

Figure 2:
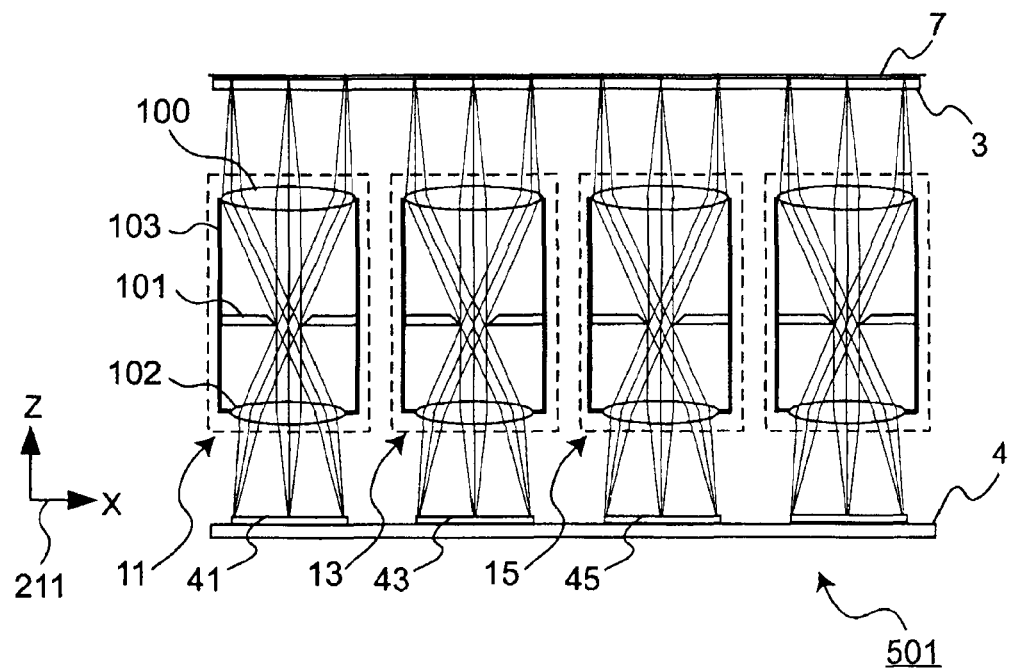
FIG. 2 is a cross sectional view illustrating a configuration of the main scanning direction in the image reading apparatus shown in FIG. 1.
Figure 3:
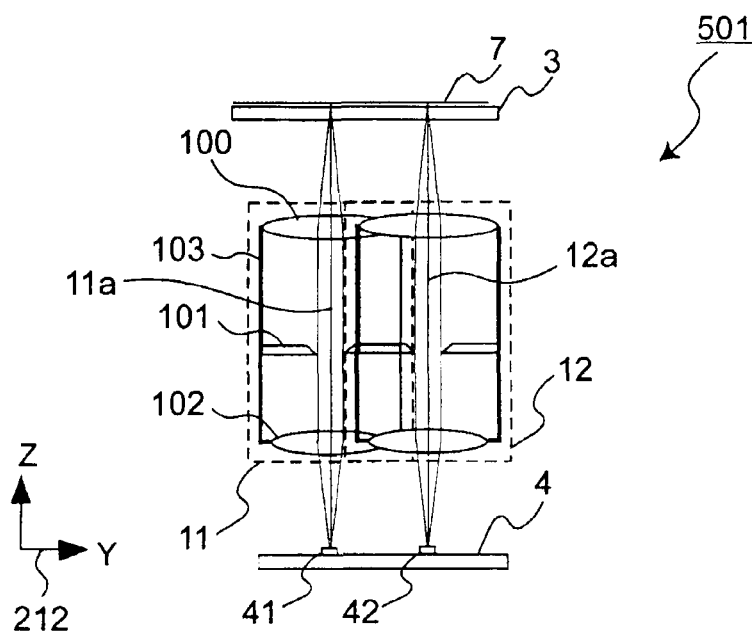
FIG. 3 is a perspective view illustrating a configuration of the sub-scanning direction in the image reading apparatus shown in FIG. 1.

FIG. 2 illustrates main optical paths and imaging optics system elements of the cells 11, 13, 15, . . . of the first row 215 in the main scanning direction 211. FIG. 3 illustrates main optical paths and imaging optics system elements when the cell 11 and the cell 12 are shown in an overlapping manner in the sub-scanning direction 212.

Each of the cells 11, 12, 13, . . . has the same structure. So, in the below explanation, the cell 11 will be explained as an example representing the cells. The cell 11 includes a first lens 100 serving as an example of a first optical element, an aperture 101 serving as an example of diaphragm, a second lens 102 serving as an example of a second optical element, and a holder 103 holding them. In the cell 11, the aperture 101 is arranged at a back focal point position of the first lens 100, so that the cell 11 can achieve a telecentric optics system at the side of the document 7.

In the first embodiment, the cells 11, 12, 13, . . . are arranged such that the optical axes of the first lenses 100, the apertures 101, and the second lenses 102 of the cells 11, 12, 13, . . . are perpendicular to the top panel 3 as shown in the figure, and in the present embodiment, the optical axes are in parallel with a Z-direction. Therefore, all the chief rays in pencils of rays of light contributing to forming an image and reflected by reading ranges on the document 7 respectively taken care of by the cells 11, 12, 13, . . . are perpendicular to the top panel 3.

The image pickup device units 41, 42, . . . are arranged on a substrate 4 to correspond to the cells 11, 12, 13, . . . . In other words, the image pickup device units 41, 43, . . . are arranged to correspond to the cells 11, 13, . . . of the first row 215, and the image pickup device units 42, 44, . . . are arranged to correspond to the cells 12, 14, . . . of the second row 216.

Figure 26:
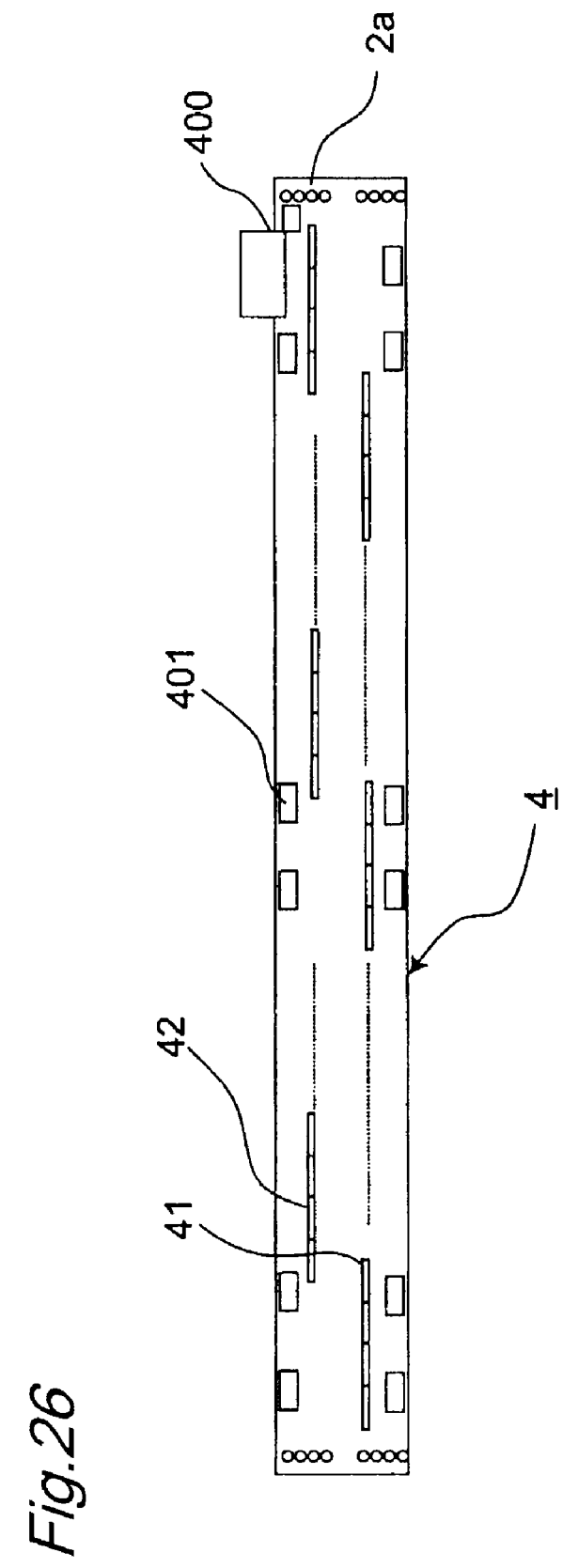
FIG. 26 is a top view illustrating an image pickup device substrate of the first to seventh embodiments.

FIG. 26 is a top view showing the substrate 4 having image pickup device units 41, 42, . . . . Numeral 2a denotes a light source connection unit for electrically connecting between the illumination light source 2 and a connector 400 of the image pickup device substrate 4.

The image pickup device units 41, 42, . . . are structured by arranging a plurality of light receiving parts, which are made of CCDs and the like, in the main scanning direction 211, or further arranging, in the sub-scanning direction 212, a plurality of rows of the above plurality of light receiving parts arranged in the main scanning direction 211.

Figure 27:
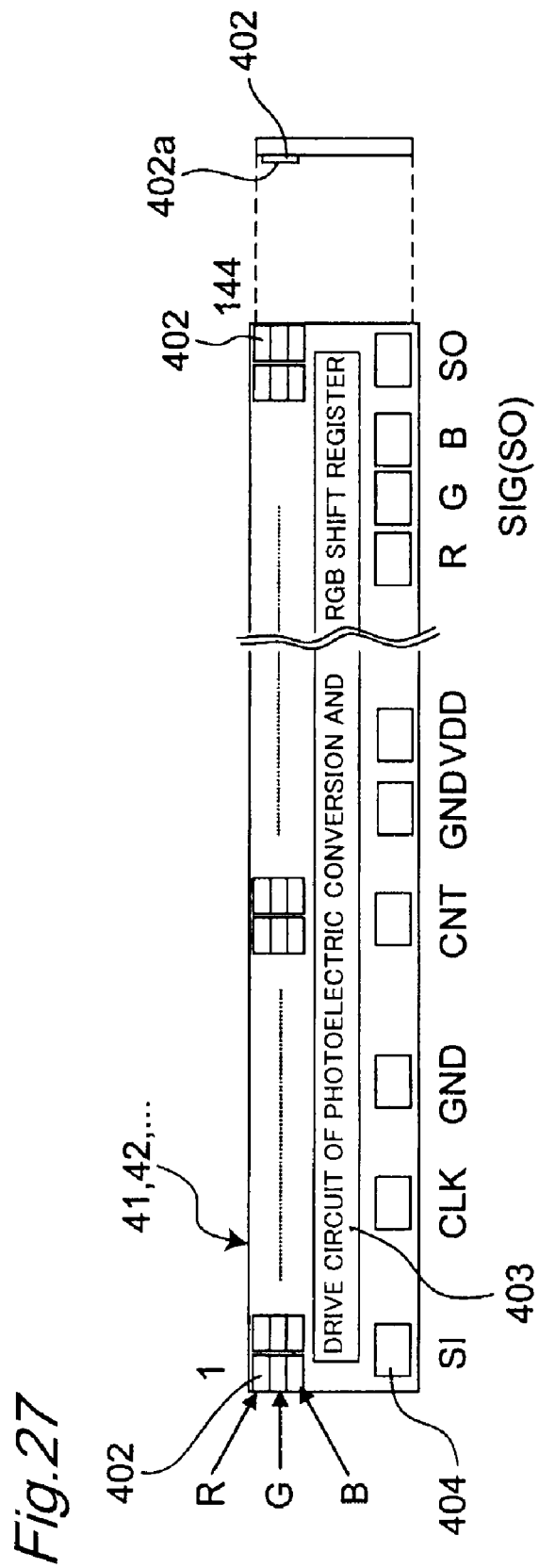
FIG. 27 is a top view illustrating a structure of an image pickup device unit of the first to seventh embodiments.

FIG. 27 is a top view showing the image pickup device units 41, 42, . . . . The image pickup device units 41, 42, . . . mainly include light receiving parts 402, a drive circuit of photoelectric conversion and RGB shift register 403, and an input/output part 404. The light receiving part 402 is an image pickup device arranged with an RGB filter 402a on a light detection surface. The RGB filter 402a includes red color (R), green color (G), and blue color (B) for one pixel, and is made of gelatin material. In the image pickup device unit 41 and the like, the light receiving parts 402 are arranged for 144 pixels along the main scanning direction 211. In other words, 144 light receiving parts 402 are arranged. The drive circuit of photoelectric conversion and RGB shift register 403 photoelectrically converts the light incident to the light receiving part 402 for each of RGBs, and holds and drives the outputs thereof. The input/output part 404 is a wire bonding pad section for inputting/outputting signals and electric power to the image pickup device unit 41 and the like.

Respective document images entered into the cells 11, 12, 13, . . . are formed as reversed images on the image pickup device units 41, 42, 43 . . . by passing through the first lens 100, the aperture 101, and the second lens 102. For example, the image on the document 7 in the section 31 on the reading line 8 passes through the cell 11 and forms an image on the image pickup device unit 41, and the formed image is taken by the image pickup device unit 41. The image in the section 32 on the reading line 9 passes through the cell 12 and forms an image on the image pickup device unit 42, and the formed image is taken by the image pickup device unit 42.

The transfer magnification of the cells 11, 12, 13, . . . may be larger than 1 (i.e., enlargement operation) or may be smaller than 1 (i.e., reduction operation). When the transfer magnification is set to 1, there is an advantage in that sensors with a common resolution available in the market can be utilized.

As described above, in the first embodiment, all the chief rays in pencils of rays of light contributing to forming an image and reflected by reading ranges on the document 7 respectively taken care of by the cells 11, 12, 13, . . . are perpendicular to the top panel 3. Therefore, in the first embodiment, a center-to-center spacing 218 in the sub-scanning direction 212 between the reading line 8 including the sections 31, 33, . . . on the document 7 read by the cells 11, 13, . . . of the first row 215 and the reading line 9 including the sections 32, 34, . . . on the document 7 read by the cells 12, 14, . . . of the second row 216 is equal to a center-to-center spacing 217 between the first row 215 and the second row 216 in the sub-scanning direction. Further, in the first embodiment, a center-to-center spacing 219 in the sub-scanning direction 212 between the image pickup device units 41, 43, . . . arranged to correspond to the cells 11, 13, . . . of the first row 215 and the image pickup device units 42, 44, . . . arranged to correspond to the cells 12, 14, . . . of the second row 216 is equal to the center-to-center spacing 217 and the center-to-center spacing 218.

The memory 5 is connected to the image pickup device units 41, 42, . . . , and stores image information transmitted from the image pickup device units 41, 42, . . . .

The processor 6 reads the image information stored in the memory 5, reconstructs an image by combining the image information, and creates the entire image of the document 7. It should be noted that the memory 5 and the processor 6 are shown separately in FIG. 1. However, it is to be understood that the memory 5 and the processor 6 may be arranged on the same substrate.

The memory 5 and the processor 6 will be explained in detail in the below explanation about the operation.

The image reading apparatus 501 according to the present embodiment is structured as described above. The operation thereof will be hereinafter explained.

The illumination light beam 201 applied from the illumination light source 2 is irradiated onto the document 7 placed on the top panel 3. First, the images of the sections 31, 33, 35 . . . on the document 7 located on the reading line 8 are taken by the cells 11, 13, 15 . . . and the image pickup device units 41, 43, 45 . . . . In other words, the light beams reflected and scattered by the sections 31, 33, 35 . . . enter into the cells 11, 13, 15 . . . , and form images on the image pickup device units 41, 43, 45 . . . arranged on the substrate 4. The respective image signals transmitted from the image pickup device units 41, 43, 45 . . . are temporarily stored in the memory 5, and the image signals are reconstructed by the processor 6.

Subsequently, the document 7 is scanned in the sub-scanning direction 212, and the cells 12, 14, . . . and the image pickup device units 42, 44, . . . take images of the sections 32, 34, . . . located on the reading line 9. The image signals transmitted from the respective image pickup device units 42, 44, . . . are temporarily stored in the memory 5, and the image signals are reconstructed by the processor 6.

Reconstruction of the images obtained by the image pickup device units 41, 42, 43 . . . corresponding to the cells 11, 12, 13 . . . will be explained.

The first row 215 and the second row 216 are away from each other by the center-to-center spacing 217 in the sub-scanning direction 212, and the document 7 is scanned in the sub-scanning direction 212. Accordingly, the cells 11, 13 . . . arranged in the first row 215 and the cells 12, 14 . . . arranged in the second row 216 read different positions on the document 7 in the sub-scanning direction 212. Therefore, an image taken by the cells 11, 13 . . . and an image taken by the cells 12, 14 . . . at a certain time are different from each other. In other words, an image on the same line in the sub-scanning direction 212 is taken at different times. Therefore, the images obtained by the image pickup device units 41, 42, 43 . . . are temporarily stored in the memory 5 in order to reconstruct the original image of the document from the images taken at different times. Then, the processor 6 reconstructs the original image of the document from the images temporarily stored. Image processing operation for performing the above reconstructing operation when a reversed image can be obtained by the configuration shown in FIG. 2 and FIG. 3 will be hereinafter explained with reference to FIG. 4 to FIG. 6.

Figure 4:
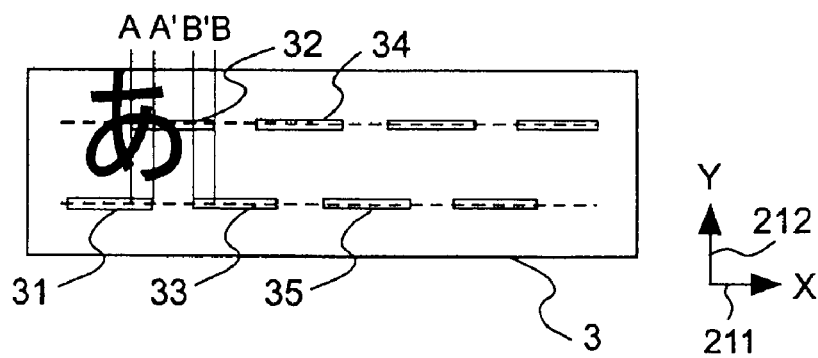
FIG. 4 is a view illustrating an example of arrangement state of a reading region on a top panel and document image character information.

FIG. 4 shows an arrangement of the sections 31, 32, . . . serving as the reading regions on the top panel 3, and also shows a character image of a Japanese character "あ"on the document 7, wherein the document 7 is not shown. In FIG. 4, a range A-A' in the main scanning direction 211 is an overlapped area between the section 31 and the section 32. A range B-B' is an overlapped area between the section 32 and the section 33. When the document 7 is scanned in the sub-scanning direction 212, the character image "あ"is scanned in the Y-direction in terms of relative positional relationship. The reason why the scanning is performed under the "relative positional relationship" is because the scanning may be performed either by moving the document 7 in the sub-scanning direction 212 with respect to the stationary image reading apparatus 501 or by moving the image reading apparatus 501 in the sub-scanning direction 212 with respect to the stationary document 7. In this example, the character image "あ"is assumed to reside in a region extending over the section 31 and the section 32.

Figure 5:
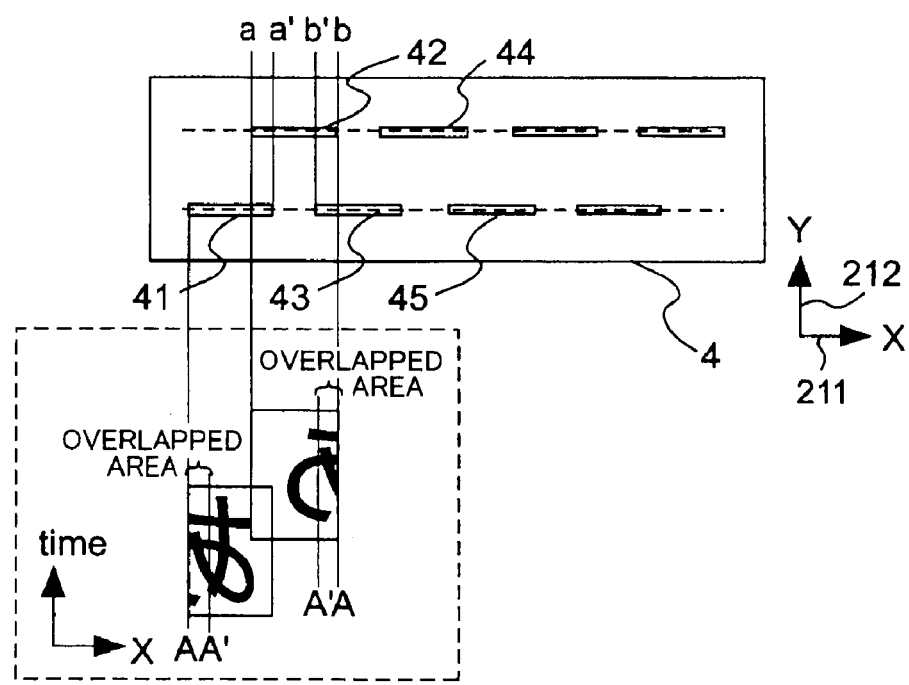
FIG. 5 is a view illustrating an example of arrangement of image pickup device units and a taken character image.
Figure 6:
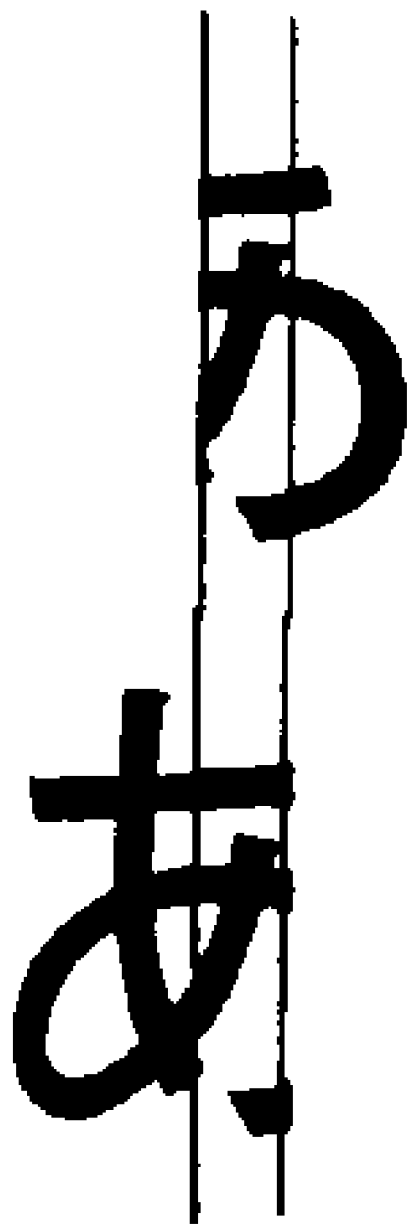
FIG. 6 is a view illustrating an example of taken character image information having been subjected to reversing processing.

FIG. 5 illustrates the image pickup device units 41, 42, . . . arranged on the image pickup device substrate 4. In FIG. 5, a range a-a' in the main scanning direction 211 is an overlapped area between the image pickup device unit 41 and the image pickup device unit 42, and a range b'-b is an overlapped area between the image pickup device unit 42 and the image pickup device unit 43. A dashed frame in FIG. 5 schematically shows the image signal of the character image "あ"obtained by the image pickup device unit 41 and the image pickup device unit 42. In the dashed frame in FIG. 5, the vertical axis denotes the time of scanning, and the horizontal axis denotes the main scanning direction 211. The image obtained by the image pickup device unit 41 is a reversed image of the character image "あ"in the section 31 in the main scanning direction 211. Likewise, the image obtained by the image pickup device unit 42 is a reversed image of the character image "あ"in the section 32 in the main scanning direction 211. In FIG. 5, an image in the range A-A' and an image in the range A'-A correspond to the overlapped area between the sections. Each of the images obtained by the two image pickup device units 41, 42 is reversed, and the reversed images are placed so as to align the overlapped area. FIG. 6 shows the two images thus drawn and arranged lengthwise. The original character image "あ" can be obtained by combining the two images in FIG. 6 such that the images in the overlapped areas of these two images match with each other. The processor 6 performs the above combining operation.

In this case, advantages arising from the above combining operation of the images will be explained. The above-explained conventional methods 2, 4, 5 describe the method for making the images obtained from the multiple imaging optics systems into erect same-magnification images and combining on the image pickup device units the images provided by the adjacent imaging optics systems. However, it is not easy to assemble an optical device consisting of mechanical elements such as multiple lenses, mirrors, and the like, in such a manner to eliminate displacement in piecing regions in which images obtained from the adjacent imaging optics systems are joined.

In contrast, the present embodiment employs the method for reconstructing the independent images obtained from the cells 11, 12 . . . to the original image by the image synthesis by means of signal processing, namely, by means of software. Therefore, even when assembly, lens manufacturing error, or the like causes a slight error in an overlapped image between a k-th cell and an adjacent (k+1)-th cell, the error can be easily corrected by the software.

As described above, when independent images are obtained for each cell and are combined into an image, there arises an effect of alleviating manufacturing error.

Subsequently, one of the major features of the present invention, namely, a structure for obtaining a large depth of field, will be hereinafter explained with reference to FIG. 7 and FIG. 8 assuming that the document 7 is, for example, a book. When the document 7 is a book and the like, the gutter of the bound book rises away from the top panel 3, and it is necessary for the image reading apparatus to have a large depth of field.

Figure 7:
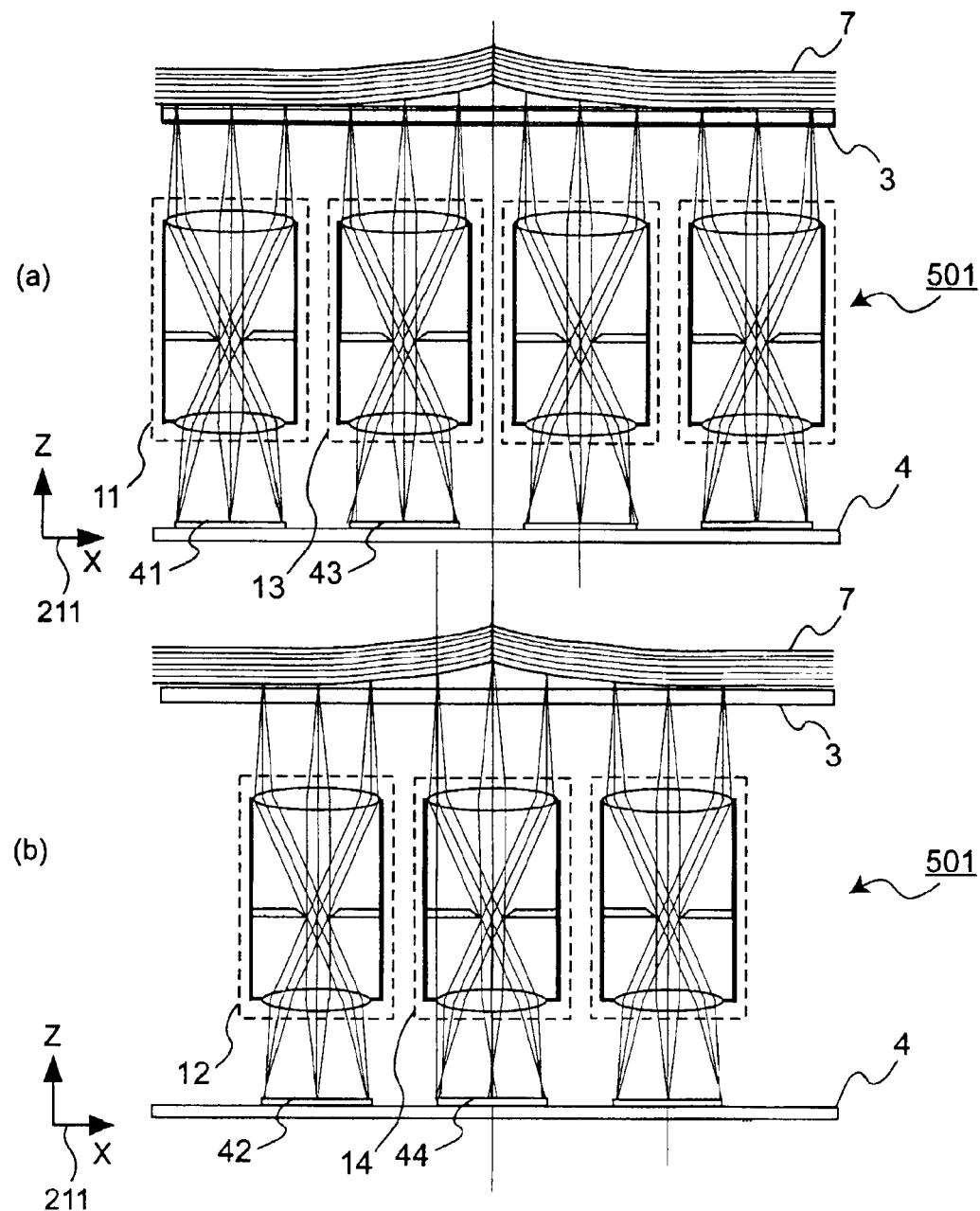
FIG. 7($a$) is a view illustrating how a book-shaped document is read by cells in the first row of the image reading apparatus shown in FIG. 1, and FIG. 7($b$) is a view illustrating how a book-shaped document is read by cells in the second row of the image reading apparatus shown in FIG. 1.
Figure 8:
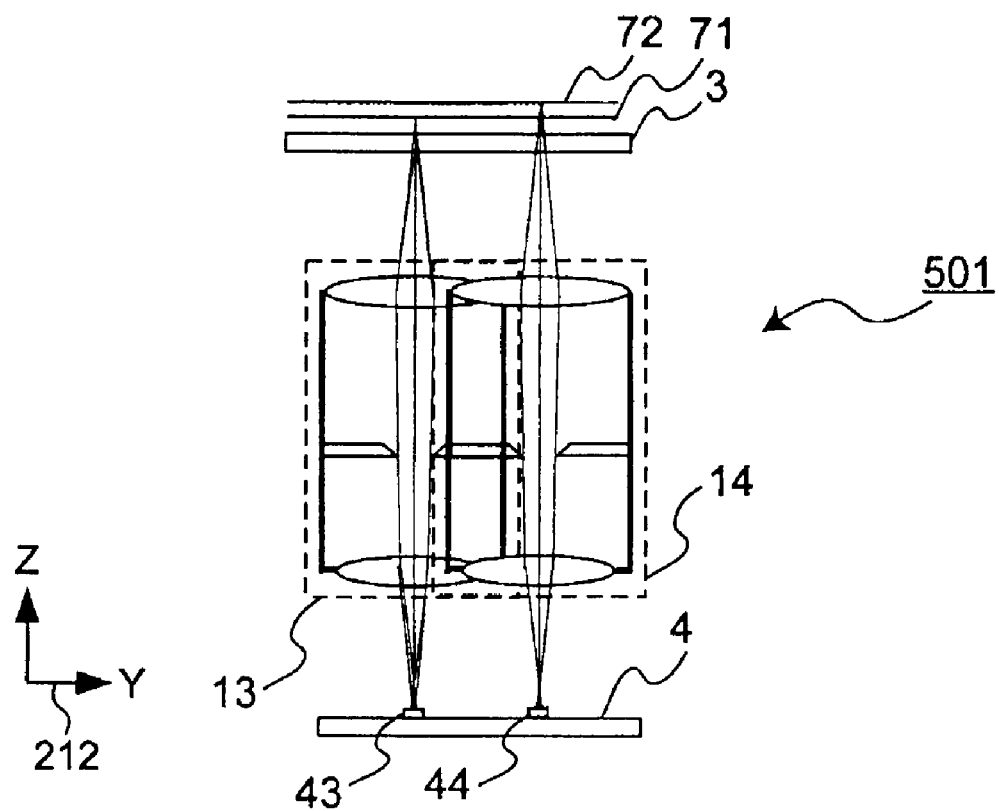
FIG. 8 is a view illustrating how a book-shaped document is read in the sub-scanning direction by the image reading apparatus shown in FIG. 1.

As shown in FIG. 7, the document 7 is assumed such that a position of the document 7 in a focus direction (Z-direction) changes depending on the position in the main scanning direction 211. FIG. 7(a) shows the cells 11, 13, . . . in the first row 215 and the light paths of the cells 11, 13, . . . FIG. 7(b) shows the cells 12, 14, . . . in the second row 216 and the light paths of the cells 12, 14, . . . FIG. 8 illustrates main optical paths and imaging optics system elements of the cell 13, 14 when the cell 13 and the cell 14 are shown in an overlapping manner in the sub-scanning direction 212. FIG. 8 also shows a case where a position on the document surface in the focus direction (Z-direction) changes depending on the position in the main scanning direction 211. In FIG. 8, numeral 71 denotes the maximum height position of the document surface in the section 33 that is read by the cell 13, and numeral 72 denotes the maximum height position of the document surface in the section 34 that is read by the cell 14.

As described above, the cells 11, 12, 13, 14, . . . of the image reading apparatus 501 according to the present embodiment constitute the telecentric optics system at the side of the document 7, wherein all the chief rays in the cell 11, 12, 13, 14, . . . included in the first row 215 and the second row 216 are perpendicular to the top panel 3. Therefore, the image reading apparatus 501 according to the present embodiment is characterized in that even when a focal point distance to the document 7 changes, the reading position at which the image pickup device unit reads the image does not change.

In other words, there is an effect in that once the parameters for image synthesizing operation are determined when the apparatus is initially assembled or initially activated, the overlapped images are not displaced from each other even when a distance between the top panel 3 and the document 7 changes depending on a point within the surface of the document 7. Therefore, the depth of field of the image reading apparatus 501 according to the present embodiment is substantially determined based on the depth of field of each of the cells 11, 12, 13, 14, . . . . The depth of field of each of the cells 11, 12, 13, 14, . . . is determined by the design of the optics system in the cell. The depth of field is substantially determined by an F value of the optics system. In order for one cell to increase the field of view, it is necessary to sufficiently correct aberration by making the lens in the cell into an aspheric shape, using a plurality of lenses, and the like. When a resolution of 600 dpi is necessary, a depth of field of about ±1 mm can be obtained where the F value is F=10, and a depth of field of about ±2 mm can be obtained where the F value is F=20. The above is merely a rough indication.

In FIGS. 2, 3, 7 and 8, the focal point is on an upper surface of the top panel 3. However, the focal point is not limited thereto. For example, in the optics system having the F value of F=10, the top panel 3 may be arranged such that the focal point is on a plane 1 mm above the upper surface of the top panel 3, so that the depth of field of ±2 mm can be sufficiently made use of.

Figure 37:
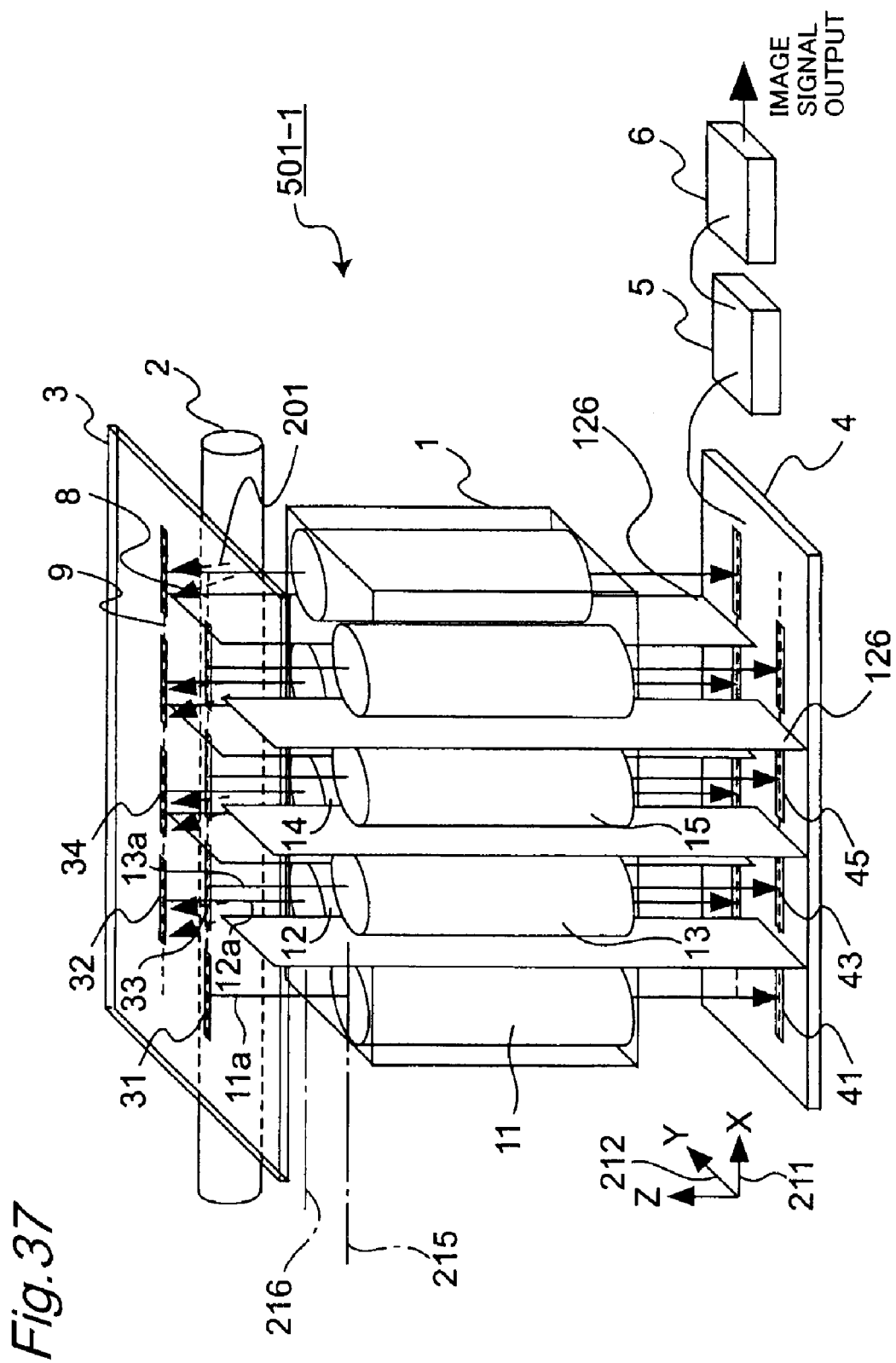
FIG. 37 is a perspective view illustrating a case where light shielding members are arranged to the image reading apparatus shown in FIG. 1.
Figure 38:
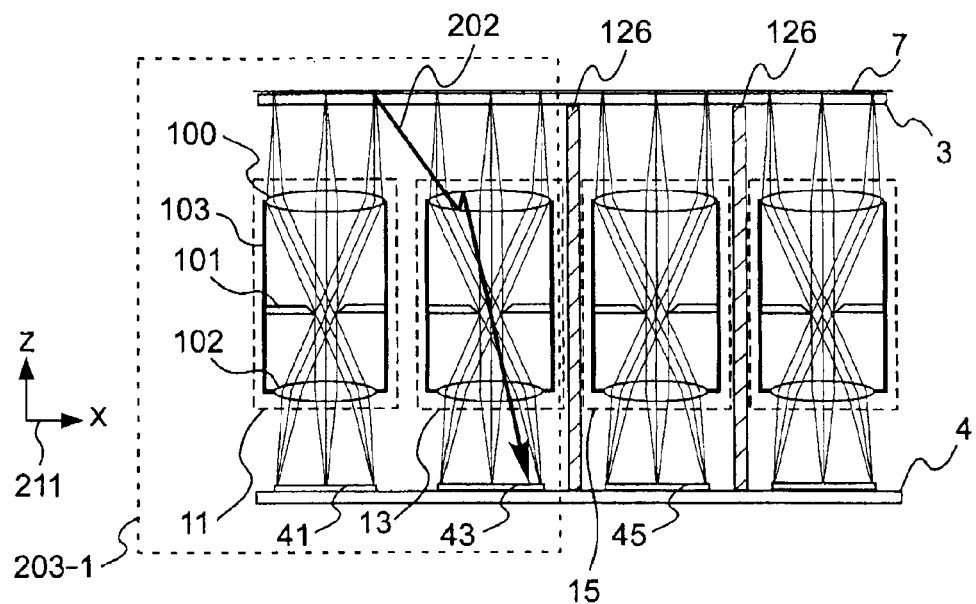
FIG. 38 is a view explaining the effects of the light shielding members when the cells are arranged zigzag.
Figure 39:
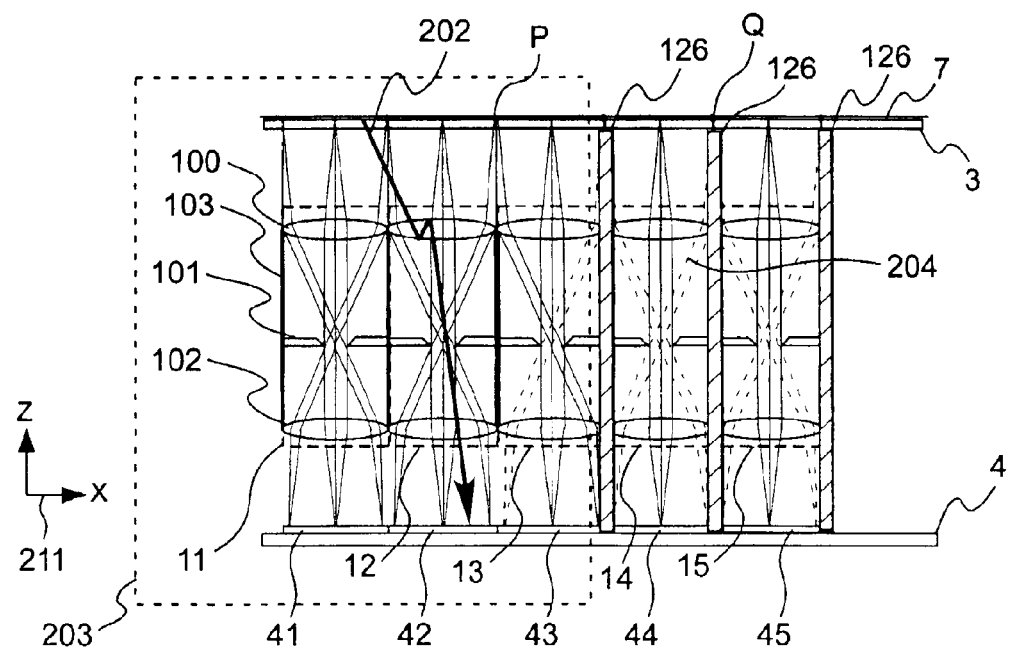
FIG. 39 is a view explaining a problem of the cells that are not arranged zigzag but are simply arranged side by side.

Subsequently, one of the major features of the present invention, namely, ease of prevention of stray light, will be hereinafter explained with reference to FIG. 37 to FIG. 39. FIG. 37 is a schematic view showing an image reading apparatus 501-1 having a light shielding member 126 inserted between the cells in addition to the elements of the image reading apparatus 501 shown in FIG. 1. FIG. 38 is a view for illustrating the effect exerted by the light shielding member 126 for the stray light concerning the cells 11, 13, . . . in the first row 215 in the main scanning direction 211. In FIG. 39, the light shielding members are additionally arranged to an image reading apparatus in which the cells are arranged side by side with the telecentric optics system at the side of the document 7. In other words, the cells are not arranged zigzag.

First, using FIG. 39, a problem arising from the configuration in which the cells are not arranged zigzag but arranged side by side will be explained. In FIG. 39, a region 203 enclosed by a dashed line does not have any light shielding member 126 inserted therein. In the outside of the dashed line region 203, the light shielding member 126 is inserted between the cells. In the dashed line region 203, stray light may be generated and go over the boundary between the cells. A stray light beam 202 is an example of such stray light. The stray light beam 202 is a light beam scattered at a high angle in the range of the field of view of the cell 11. The stray light beam 202 enters into the first lens 100 of the cell 12 adjacent to the cell 11. The stray light beam 202 is multiple-reflected in the first lens 100 of the cell 12, and thereafter the stray light beam 202 passes through the aperture 101 of the cell 12 and the second lens 102 of the cell 12. Ultimately, the stray light beam 202 reaches the image pickup device unit 42 corresponding to the cell 12.

As described above, when the light shielding member 126 is not arranged between the cells, the light beam from the range of the field of view of the adjacent cell may stray into the cell. The above stray light may cause a phenomenon called "ghost" in which the image in the range of the field of view of the adjacent cell appears. Even though the stray light beam does not form the image such as the "ghost", the stray light beam may make the whitish image in whole and reduce the contrast of the image, which results in a phenomenon called flare.

In order to shield this stray light, the light shielding member 126 is inserted between the cells. This state is shown in the outside of the dashed line region 203 on the right side of FIG. 39.

However, when the light shielding member 126 is arranged, there is a problem in that the light shielding member 126 shields even necessary light beams, in proximity to the boundary of the cells, needed for forming an image. When the light shielding member 126 is not arranged, a light beam reflected by a point on the boundary between the cells, e.g., a point P in the figure, separates into the cell 12 and the cell 13, and reaches the image pickup device unit 42 and the image pickup device unit 43. Accordingly, each of the image pickup device units obtains an image signal.

On the other hand, when the light shielding member 126 is arranged, for example, a light beam reflected by a point Q in the figure is shielded by the light shielding member 126. In FIG. 39, optical paths indicated as dashed lines represent optical paths in a case where the light shielding members 126 are not arranged. These optical paths do not exist when the light shielding members 126 are arranged.

As described above, when the cells 11, 12, . . . are not arranged zigzag but are simply arranged side by side, and the light shielding member 126 is arranged between the cells, there is a problem in that an image signal between adjacent cells cannot be obtained, and an image at each boundary of cells is lost.

In contrast, when the cells 11, 12, . . . are arranged zigzag as in the image reading apparatus 501 according to the present embodiment, a gap exists between the cells as can be seen from FIG. 37 or FIG. 38. When the light shielding member 126 is arranged between the gap, the light shielding member 126 can prevent the stray light beam from going over the boundary between the cells without shielding the image signal. This feature will be explained in detail with reference to FIG. 38.

In FIG. 38, the light shielding member 126 is not arranged between the cells in a region 203-1 enclosed by the dashed frame. In this case, the stray light 202 may be generated and go into an adjacent cell, in the same manner as the stray light in the dashed line region 203 as shown in FIG. 39.

On the other hand, in the outside of the dashed line region 203-1 on the right side of FIG. 38, the light shielding member 126 is arranged in order to shield the stray light path 202. When the cells 11, 12, . . . are arranged zigzag, spatial regions in which there is no light beam contributing to image formation exists between the cells. In addition, regions which do not contribute to form images exist between the adjacent sections 31, 33, 35, . . . and between the adjacent sections 32, 34, 36, . . . . Likewise, gaps exist between the adjacent image pickup device units 41, 43, 45, . . . and between adjacent image pickup device units 42, 44, 46, . . . . Therefore, it is possible to arrange the light shielding members 126 in these gaps.

As described above, in the image reading apparatus 501 according to the present embodiment, the cells 11, 12, . . . are arranged zigzag, and therefore, the light shielding members 126 can be arranged between the adjacent cells even when it is a telecentric optics system at the side of the document 7. As a result, the image reading apparatus 501 according to the present embodiment can shield the light beams such as the flare and the ghost generated by the stray light other than the light beams forming the desired image, and can obtain a clear image.

Second Embodiment

An example of an image reading apparatus 502 according to the second embodiment of the present invention will be explained with reference to FIG. 9 to FIG. 12.

In the image reading apparatus 501 according to the first embodiment, as shown in FIG. 2, the light beams which are directed from the document 7 to the cells 11, 13, . . . in the chief rays of the cells 11, 13, . . . of the first row 215 are in parallel with each other, and the light beams which are directed from the document 7 to the cells 12, 14, . . . in the chief rays of the cells 12, 14, . . . of the first row 216 are in parallel with each other. Further, in between the cells 11, 13, . . . of the first row 215 and the cells 12, 14, . . . of the second row 216, the light beams which are directed from the document 7 to the cells among the chief rays are in parallel with each other, as shown in FIG. 3. In the example of the embodiment, since the optical axes go straight ahead, the phrase the "light beams" which are directed from the document 7 to the cells among the chief rays may be paraphrased as "optical axes".

Figure 9:
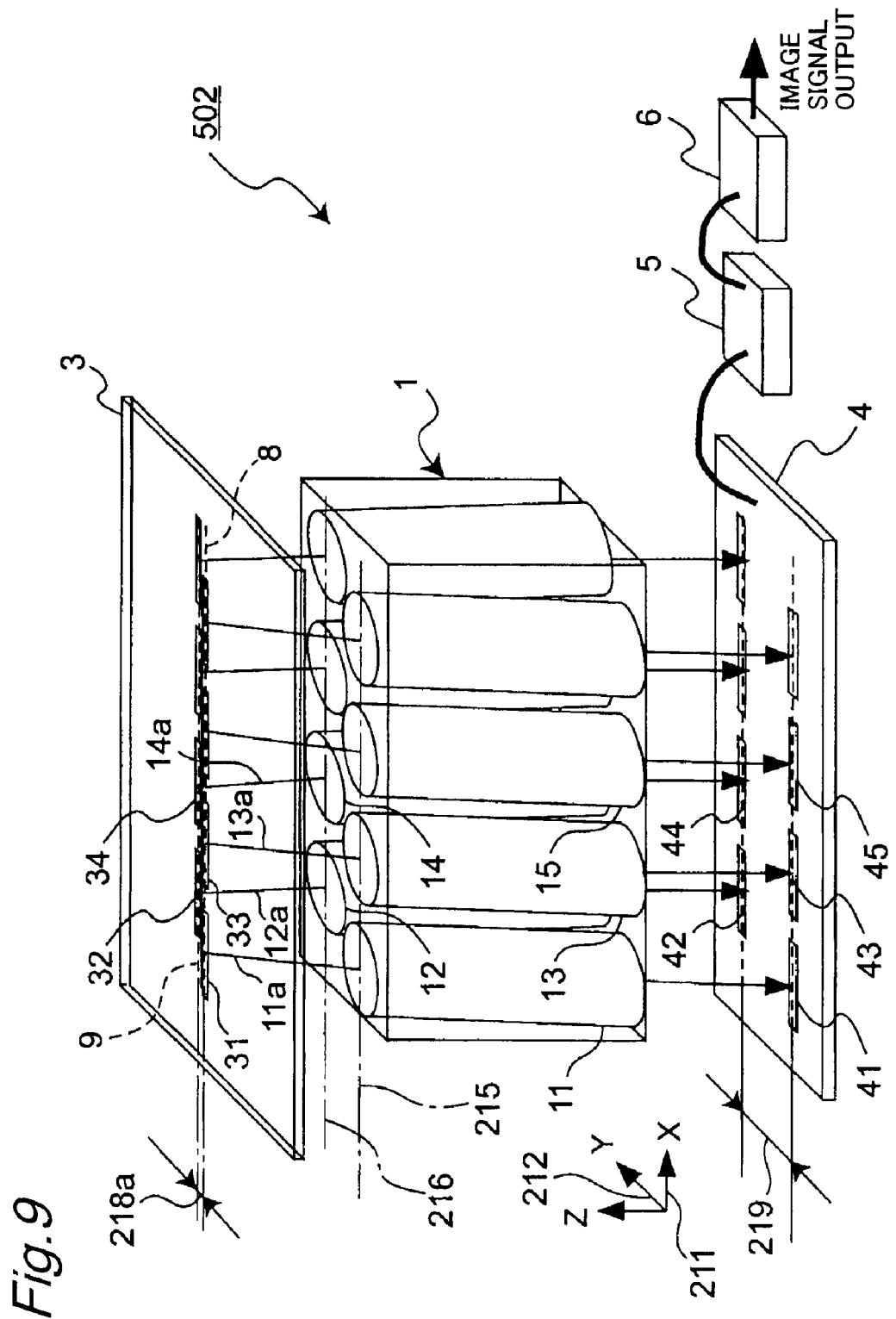
FIG. 9 is a perspective view illustrating a structure of an image reading apparatus according to the second embodiment of the present inventions.
Figure 10:
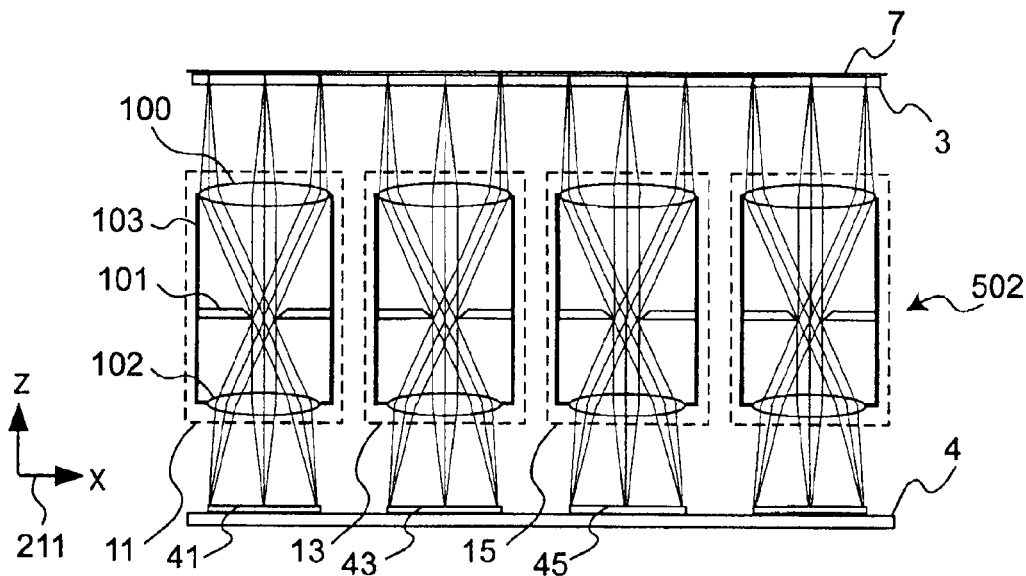
FIG. 10 is a cross sectional view illustrating a structure in the main scanning direction of the image reading apparatus shown in FIG. 9.
Figure 11:
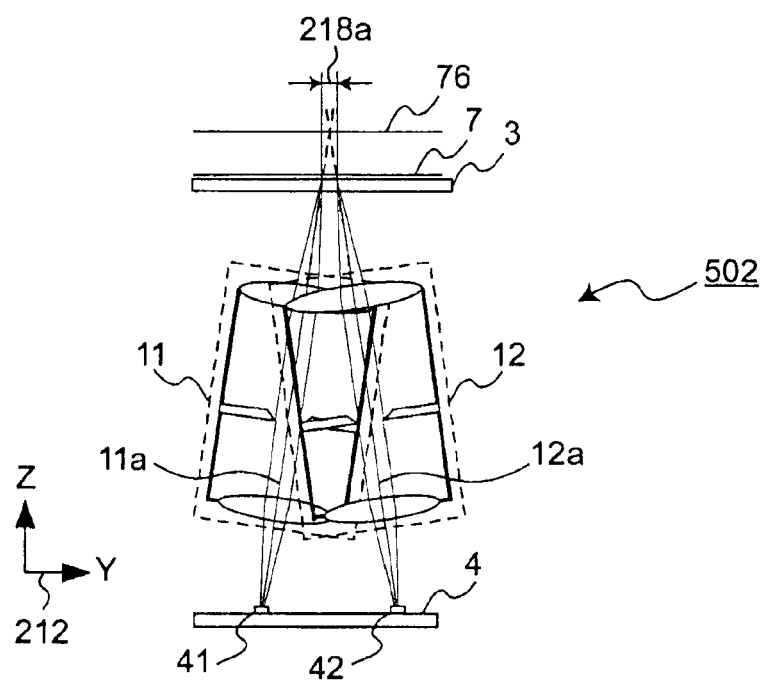
FIG. 11 is a perspective view illustrating a structure in the sub-scanning direction of the image reading apparatus shown in FIG. 9.

In contrast, in the image reading apparatus 502 according to the second embodiment, as shown in FIG. 10, the light beams which are directed from the document 7 to the cells 11, 13, . . . in the chief rays of the cells 11, 13, . . . of the first row 215 are in parallel with each other, and the light beams which are directed from the document 7 to the cells 12, 14, . . . in the chief rays of the cells 12, 14, . . . of the first row 216 are in parallel with each other. However, in the cells 11, 13, . . . of the first row 215 and the cells 12, 14, . . . of the second row 216, respective light beams from the first row and the second row, which are directed from the document 7 to the cells among the chief rays, are not in parallel with each other as shown in FIG. 11. The other structures of the image reading apparatus 502 are not different from the structures of the above-described image reading apparatus 501. Accordingly, in the below explanation, only the different constituent parts will be explained. FIG. 9 does not show the illumination light source 2 for the sake of simplicity of illustration.

As shown in FIG. 9 and FIG. 11, in the image reading apparatus 502, the cells 11, 13, . . . of the first row 215 and the cells 12, 14, . . . of the second row 216 are arranges such that optical axes 11a, 13a, . . . of the cells 11, 13, . . . of the first row 215 and optical axes 12a, 14a, . . . of the cells 12, 14, . . . of the second row 216 are inclined toward the side of the gaps between the first row 215 and the second row 216. More specifically, in the present embodiment, the cells 11, 13, . . . of the first row 215 are inclined about the X-axis (main scanning direction 211) by −10 degrees, and the cells 12, 14, . . . of the second row 216 are inclined about the X-axis by +10 degrees. As a result, in the second embodiment, as shown in FIG. 11, the optical axes 11a, 12a, and the like of them both intersect each other at a position 76 above the top panel 3, and at the top panel 3, the optical axes 11a, 12a, and the like are away from each other by a gap 218a.

Figure 12:
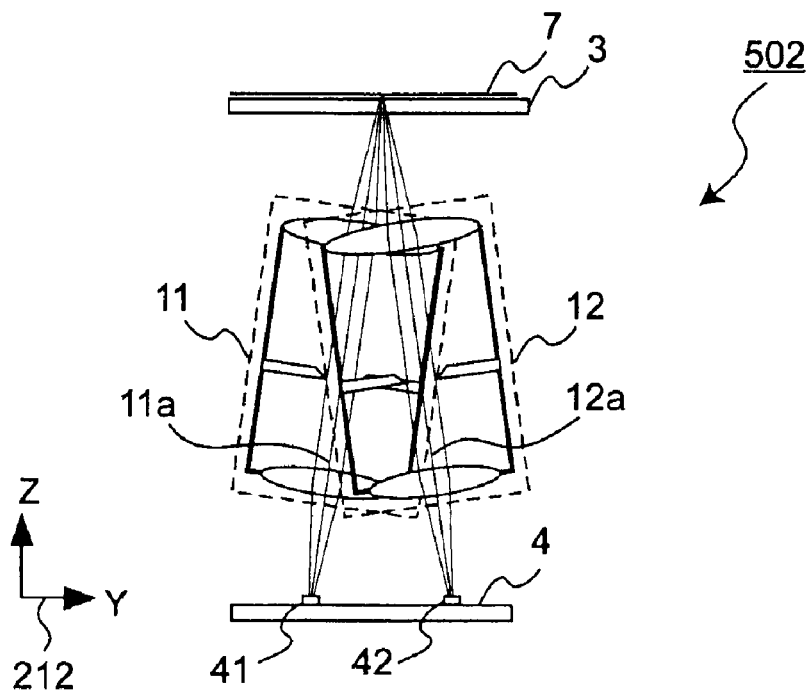
FIG. 12 is a perspective view in the sub-scanning direction illustrating a variation of a structure of the image reading apparatus shown in FIG. 9.

It should be noted that the optical axes 11a, 12a, and the like of them should not necessarily intersect each other at the position 76 above the top panel 3, and may intersect each other on the upper surface of the top panel 3 as shown in FIG. 12. FIG. 9 shows a case corresponding to FIG. 11. In FIG. 9, the reading lines 8 and 9 are away from each other by the center-to-center spacing 218a in the sub-scanning direction. This center-to-center spacing 218a is narrower than the center-to-center spacing 218 of the image reading apparatus 501 shown in FIG. 1.

As described above, the structure of the image reading apparatus 502 according to the second embodiment is basically not different from the structure of the above-described image reading apparatus 501 according to the first embodiment. Therefore, the image reading apparatus 502 can also achieve the above-described effects achieved by the image reading apparatus 501. In addition, the image reading apparatus 502 according to the second embodiment can achieve the following special effects.

That is, as shown in FIG. 11 and FIG. 12, a direction of the optical axes 11a, 12a, and the like of the cells 11, 12, . . . in the first row 215 and the second row 216 are inclined with respect to the top panel 3. Therefore, the reading lines 8 and 9 are arranged closer to each other on the document 7, so that the capacity of the memory 5 temporarily storing the image signals can be reduced, and the cost can be reduced.

In other words, as explained in the first embodiment, the image formed by the cells 11 and the like in the first row 215 and the image formed by the cells 12 and the like in the second row 216 are obtained with a time difference of scanning in the sub-scanning direction 212. Accordingly, it is necessary for the memory to have enough capacity for storing image information corresponding to the above time difference. Therefore, the narrower the center-to-center spacing 218 between the reading lines 8 and 9 in the sub-scanning direction is, the less the capacity of the memory can be. In the image reading apparatus 502 according to the second embodiment, the center-to-center spacing 218a between the reading lines 8 and 9 in the sub-scanning direction is narrower than that of the image reading apparatus 501 as described above. As a result, the capacity of the memory can be reduced to less than that of the image reading apparatus 501.

On the other hand, when the center-to-center spacing 218 between the reading lines 8 and 9 in the sub-scanning direction is narrow, and the document 7 rises away from the top panel 3, there occurs a phenomenon that the image is displaced in the sub-scanning direction 212 depending on a distance of a rise of the document 7 away from the top panel 3. However, since the image reading apparatus 502 according to the second embodiment also has the telecentric optics system at the side of the document 7 as described above, the transfer magnification does not change. Therefore, displacement of image in the main scanning direction 211 does not occur, and the correction therefor can be easily performed by simply shifting an image in the sub-scanning direction 212. The images of these adjacent cells can be combined by shifting the images in the sub-scanning direction 212 such that images representing the same region taken by the adjacent cells match each other.

Third Embodiment

An example of an image reading apparatus 503 according to the third embodiment of the present invention will be explained with reference to FIG. 13.

In the first embodiment and the second embodiment described above, the cells 11, 12, . . . are arranged such that the light beams 11a, 12a . . . among the chief rays of the cells 11, 12, . . . , which are directed from the document 7 to the cells, are vertical or slightly inclined with respect to the top panel 3. In contrast, in the image reading apparatus 503 according to the third embodiment, the cells 11, 12, . . . are arranged such that respective light beams among the chief rays of the cells 11, 12, . . . , which have been bent by bending mirrors 111, 112 are in parallel or substantially in parallel with respect to the top panel 3.

In other words, in the image reading apparatus 503 according to the third embodiment, the bending mirrors 111, 112 are arranged between the document 7 and the cells 11, 12, . . . so as to bend optical paths of scattered light beams that are reflected on the document 7 and enter to the cells 11, 12, . . . . In the present embodiment, the first bending mirror 111 is arranged to correspond to the optical axes 11a, 13a, . . . of the cells 11, 13, . . . in the first row 215, and the second bending mirror 112 is arranged to correspond to the optical axes 12a, 14a, . . . of the cells 12, 14, . . . in the second row 216. In the present embodiment, the bending mirrors 111, 112 are mirrors for bending the optical paths 45 degrees. As shown in FIG. 13, the first bending mirror 111 bends the optical paths to the left side in the sub-scanning direction 212 to guide the light reflected by the document 7 to the cells 11, 13, . . . , and the second bending mirror 112 bends the optical paths to the right side in the sub-scanning direction 212 to guide the light reflected by the document 7 to the cells 12, 14, . . . .

The other structures of the image reading apparatus 503 are not different from the structures of the above-described image reading apparatus 501 according to the first embodiment. Therefore, the image reading apparatus 503 according to the third embodiment can also achieve the above-described effects achieved by the image reading apparatus 501 according to the first embodiment.

The image reading apparatus 503 according to the third embodiment has the bending mirrors 111, 112, and therefore further achieves the following effects. The cells 11, 12, 13, . . . of the image reading apparatus 503 are arranged in parallel or substantially in parallel with respect to the top panel 3. Therefore, this structure can reduce the thickness of the image reading apparatus in a Z-direction, i.e., a thickness direction of the top panel 3. Thus, a small image reading apparatus can be obtained.

Fourth Embodiment

Figure 14:
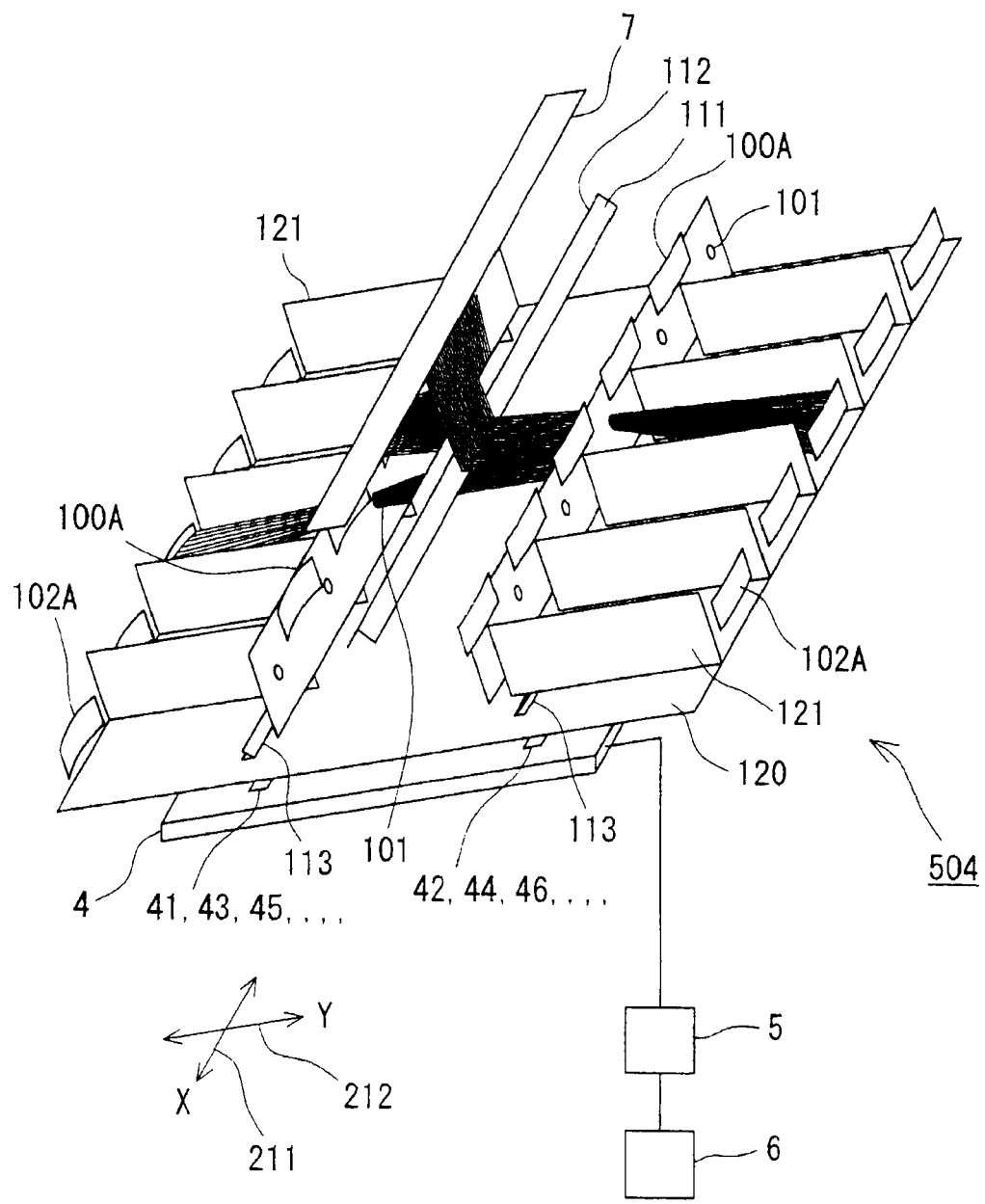
FIG. 14 is a perspective view illustrating a structure of an image reading apparatus according to the fourth embodiment of the present inventions.
Figure 15:
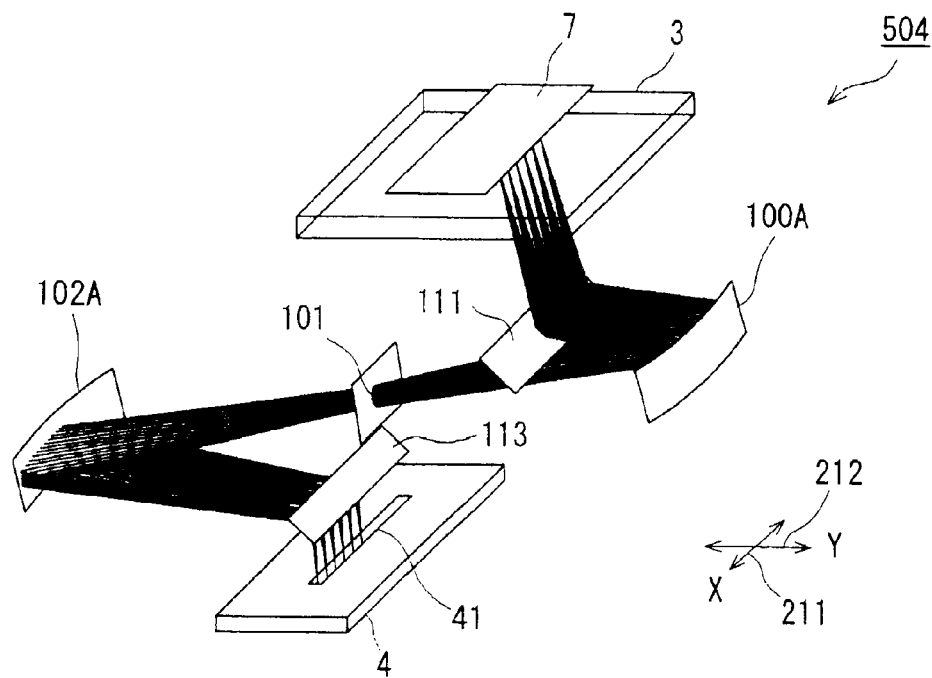
FIG. 15 is a perspective view showing a structure of one cell in the image reading apparatus shown in FIG. 14.
Figure 16:
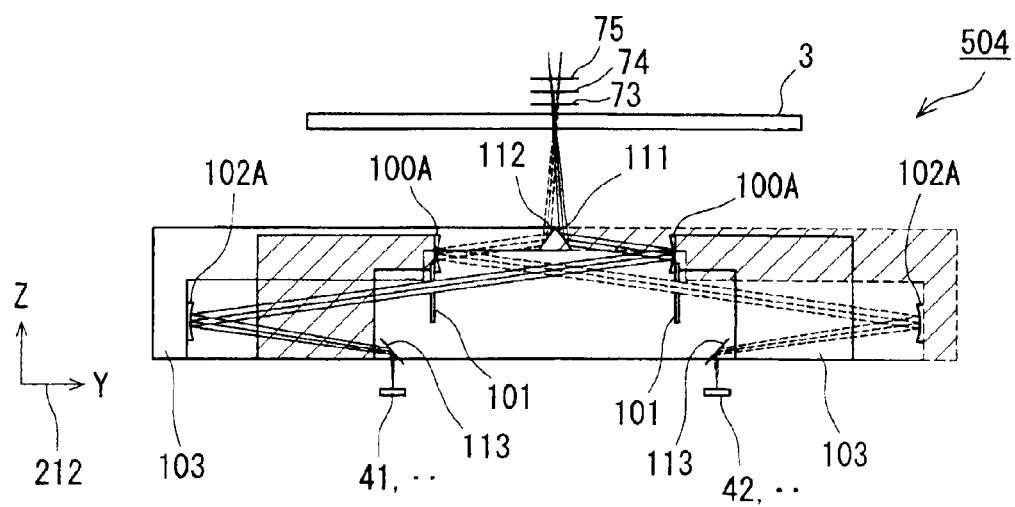
FIG. 16 is a perspective view in the sub-scanning direction illustrating a structure of the image reading apparatus shown in FIG. 14.

An example of an image reading apparatus 504 according to the fourth embodiment of the present invention will be explained with reference to FIG. 14 to FIG. 16. FIG. 14 does not show the illumination light source 2, the top panel 3, and the like for the sake of simplicity of illustration. FIG. 15 illustrates only the optical elements of one cell extracted from the structures shown in FIG. 14. FIG. 16 is a cross sectional view of the image reading apparatus 504 taken along the sub-scanning direction 212. In FIG. 16, a direction perpendicular to the sheet plane of the FIG. 16 is the main scanning direction 211.

In the above-described first to third embodiments, the first lens 100, the aperture 101, and the second lens 102 constituting each of the cells 11, 12, 13, 14, . . . are arranged in one line. The optical axis passes through the first lens 100, the aperture 101, and the second lens 102 in a straight line without bending.

In contrast, the cells 11, 12, 13, 14, . . . which are more suitable for the actual structure of the image reading apparatus are shown in the fourth embodiment, and the below-described fifth and seventh embodiments.

The fourth embodiment and the below-described fifth to seventh embodiments have the same basic structure as the above-described first embodiment in that: the cells 11, 13, . . . and the cells 12, 14, . . . are arranged along the first row 215 and the second row 216; each of the cells 11, 12, 13, 14, . . . has the telecentric optics system at the side of the document; the cells 11, 13, . . . and the cells 12, 14, . . . of the first row 215 and the second row 216 form images of the sections 31, 32, 33, 34, . . . of the reading lines 8, 9 on the document 7; the image pickup device units 41, 42, 43, 44, . . . are arranged to correspond to the cells 11, 12, 13, 14, . . . ; and the apparatus includes the memory 5 and the processor 6. Therefore, the image reading apparatus according to the fourth embodiment and the below-described fifth to seventh embodiments can also achieve the above-described effects achieved by the image reading apparatus 501 according to the first embodiment.

The difference between the fourth embodiment and the first embodiment will be explained in detail. In the image reading apparatus 504 according to the fourth embodiment, the members equivalent to the first lens 100 and the second lens 102 are made of reflective optical elements such as concave mirrors. Further, the optical paths are bent by the reflective optical elements. Further, the third bending mirrors 113 are arranged between the concave mirrors corresponding to the second lenses 102 of the cells 11, 12, 13, ... and the image pickup device units 41, 42, 43, ....

In the fourth, fifth, and seventh embodiments, both of the first lens 100 and the second lens 102 are made of concave mirrors. Accordingly, the size of the image reading apparatus can be reduced in the Z-direction and the sub-scanning direction 212. However, the embodiments are not limited thereto. Alternatively, at least one of the first lens 100 and the second lens 102 may be made of a reflective optical element.

As described above, the concave mirror, i.e., an example of a reflective optical element, performs the same function as the first lens 100 and the second lens 102 explained in the first to third embodiments, but the configurations of them are different. In the below explanation, a first concave mirror 100A is assumed to be an example of element corresponding to the first lens 100 and performing the functions of the first optical element, and a second concave mirror 102A is assumed to be an example of element corresponding to the second lens 102 and performing the functions of the second optical element.

Further, the image reading apparatus 504 will be explained in detail.

The light applied by the illumination light source 2 is reflected and scattered by the document 7, and enters into the cell 11 and the like. In this case, an optical path and structure of only one cell, for example, the cell 11 will be explained in detail using numeral values. A reading width of the one cell 11 in the main scanning direction 211 is 10 mm. The inclination angle of the optical axis with respect to the top panel 3 is 5 degrees in the sub-scanning direction 212. A pencil of rays having a chief ray at an angle of 5 degrees in the sub-scanning direction with respect to the surface of the document contributes to image formation. The optical path of this pencil of rays is bent by the first bending mirror 111. In FIG. 16, the light beam is deflected to a direction of 8 degrees with respect to the Y-axis.

The first concave mirror 100A has a focal length of f=20 mm. A distance between the document surface and the first concave mirror 100A is designed to be about 20 mm. The pencil of rays reflected by the first concave mirror 100A is collimated. The aperture 101 is arranged at a distance 20 mm from the first concave mirror 100A in the optical axis path. Since this is the same as the focal length of the first concave mirror 100A, this cell has the telecentric optics system at the side of the document.

An aperture diameter of the aperture 101 determines the brightness of the optics system and the depth of field. In this example, the aperture diameter of the aperture 101 is set to φ 1 mm. Accordingly, the F value of the optics system is 20. When the arrangement of optical parts of the entire cell is optimized, and the first concave mirror 100A and the second concave mirror 102A are optimized using aspheric shape, a depth of field of ±2 mm, i.e., 4 mm, can be sufficiently obtained.

The light beam having passed through the aperture 101 is condensed by the second concave mirror 102A, and is reflected by a third bending mirror 113. Thereafter, the light beam forms an image on the image pickup device unit 41. At this occasion, when the second concave mirror 102A has an F value of f=20 mm, a reversed image having a transfer magnification of 1 can be obtained. The method for reconstructing this reversed image is as explained in the first embodiment.

In this example, both of the length of the optical path from the aperture 101 to the second concave mirror 102A and a distance from the second concave mirror 102A to the image pickup device unit 41 are set to 20 mm respectively. Therefore, the telecentric optics system is formed not only at the side of the document but also on the side of the image. In this way, the telecentric optics system also arranged on the side of the image has an effect of maintaining a constant magnification ratio of image formation regardless of the installation position of the image pickup device unit 41 and the like in the focus direction.

As described above, in the present embodiment, the first concave mirror 100A and the second concave mirror 102A use concave mirrors. Therefore, there is also an advantage in that chromatic aberration does not occur. Especially, the optics system having the large depth of field, which is a feature of each embodiment, tends to have a problem of chromatic aberration. However, chromatic aberration can be avoided by forming the reflective optics system as shown in the present embodiment. Further, since the reflective mirrors are used, the optical paths can be bent, and accordingly, there is an advantage in that the size of the entire optics system can be reduced in the Z-direction and the sub-scanning direction 212.

In the example described above, the length of the optical path from the document 7 to the image pickup device unit 41 is 80 mm. In other words, when the bending mirror 111, 113 are not arranged, and the concave mirrors such as the first concave mirror 100A and the second concave mirror 102A are not used, the thickness of the entire optics system in the Z-direction reaches a size of about 80 mm. However, since the optical paths are bent, the thickness of the optics system in the Z-direction can be reduced to about 23 mm.

Since the transfer magnification is 1, already-existing image device units can be made use of, and there is an advantage in that the cost can be reduced. In other words, if the optics system is reduction system, the resolution of the image obtained by the resolution of the image pickup device unit itself deteriorates unless one pixel in the image pickup device unit is decreased depending on the reduction rate thereof. When the existing contact image sensor taking an erect same-magnification images is assumed to have a resolution of 600 dpi, the resolution of 600 dpi can be achieved by making use of this image pickup device unit as it is.

Since the transfer magnification is 1, the same member can be used for both of the first concave mirror 100A and the second concave mirror 102A. Especially, when the telecentric optics system is arranged not only at the side of the document but also on the side of the image as in the present embodiment, an optics system having an image-forming condition of a sufficiently large resolution can be designed even if the first concave mirror 100A and the second concave mirror 102A are designed to have the same shape in terms of optimization design of the lenses. There is an effect of reducing the cost by using the same member.

Subsequently, a structure including a combination of cells 11 and the like will be explained. Optical axes inclined about the X-axis by +5 degrees with respect to the document surface exert affect on the cells 11, 13, ... in the first row 215. Optical axes inclined about the X-axis by −5 degrees with respect to the document surface affect on the cells 12, 14, ... in the second row 216. The interval between the k-th cell and the (k+1)-th cell in the sub-scanning direction 212, namely, the interval between the reading lines 8 and 9, is 9 mm. On the other hand, the interval between the cells in the same row, namely, the interval between the k-th cell and the (k+2)-th cell, is 18 mm. Since the reading width of one cell is 10 mm, the overlapped width of the reading regions between the adjacent cells, namely, between the k-th cell and the (k+1)-th cell is 1 mm. The width of 1 mm in the main scanning direction 211 at the resolution of 600 dpi is equivalent to about 24 pixels, which is sufficiently large for image-combining operation between the adjacent cells as explained in the first and second embodiments.

As shown in FIG. 16, the first half of the optical paths of the cells 11, 13, . . . in the first row 215 and the cells 12, 14, . . . in the second row 216, namely, the optical paths from the document surface to the apertures 101 are folded back. Each optical path is not overlapped in terms of three-dimensional space. Since the optical paths are thus folded back, the size of the entire optics system can be reduced.

The focal point position at the side of the document is designed to be at a position 73 which is 1 mm away from the upper surface of the top panel. Further, the reading line 8 of the cells 11, 13, . . . in the first row 215 and the reading line 9 of the cells 12, 14, . . . in the second row 216 are designed to intersect each other at the position 73. As described above, the optics system itself has the depth of field of ±2 mm, and accordingly, a sufficient resolution can be obtained from the upper surface of the top panel 3 to a position 75 which is 3 mm therefrom. In other words, the depth of field of this image reading apparatus 504 is 3 mm from the upper surface of the top panel. The focal point position has a better resolution than even the range within the depth of field, and therefore, the setting is thus made. However, when a larger depth of field is desired, the position of the top panel 3 may be lowered so that the focal point is positioned 2 mm away from the upper surface of the top panel 3. As a result, the depth of field can be made larger, i.e., 4 mm from the upper surface of the top panel 3.

As the position of the document surface leaves away from the position 73, the reading line 8 of the cells 11, 13, . . . in the first row 215 and the reading line 9 of the cells 12, 14, . . . in the second row 216 are further spaced apart from each other. This is because, as explained in the second embodiment, the reading lines 8 and 9 are simply shifted in the sub-scanning direction 212, since the optics system is telecentric at the side of the document, so that the transfer magnification does not change in the main scanning direction 211 and the sub-scanning direction 212 and the optical axis is perpendicular to the main scanning direction 211. Thus, the displacement caused by the shift of the reading lines 8 and 9 can be corrected, regardless of asperity on the document surface, by the processor 6 processing the image stored in the memory 5.

Figure 17:
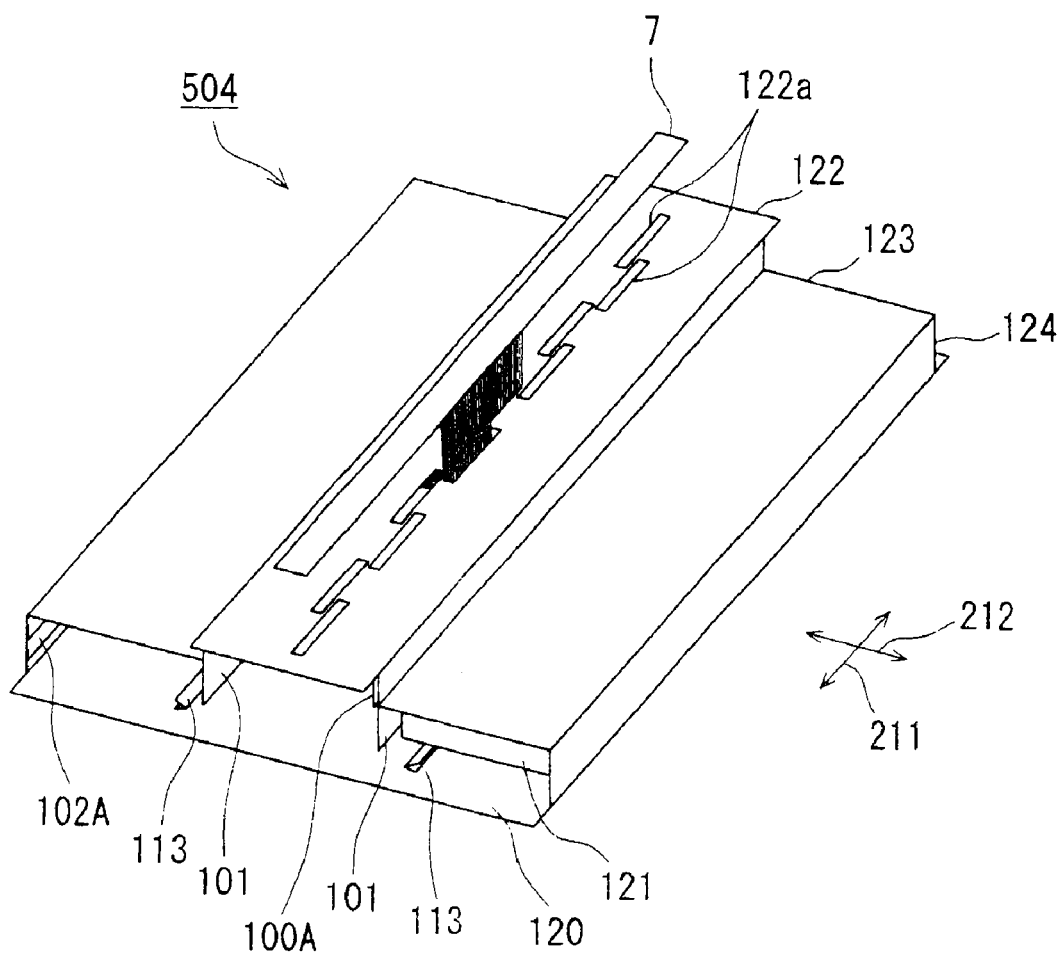
FIG. 17 is a perspective view illustrating a structure of the image reading apparatus shown in FIG. 14.

FIG. 14 shows the internal structure so that the structure of the optical elements can be easily understood. But in reality, it is preferable to arrange light shielding members 123 and 124 and a light shielding slit 122 as shown in FIG. 17. In this example, the F value is set to F=20 in order to have a large depth of field, and the optics system is configured such that the amount of light taken into the imaging optics system is small. In other words, most of light beams produced through scattering of illumination light by the document 7 do not form an image, and therefore, it is necessary to effectively shield them.

Figure 18:
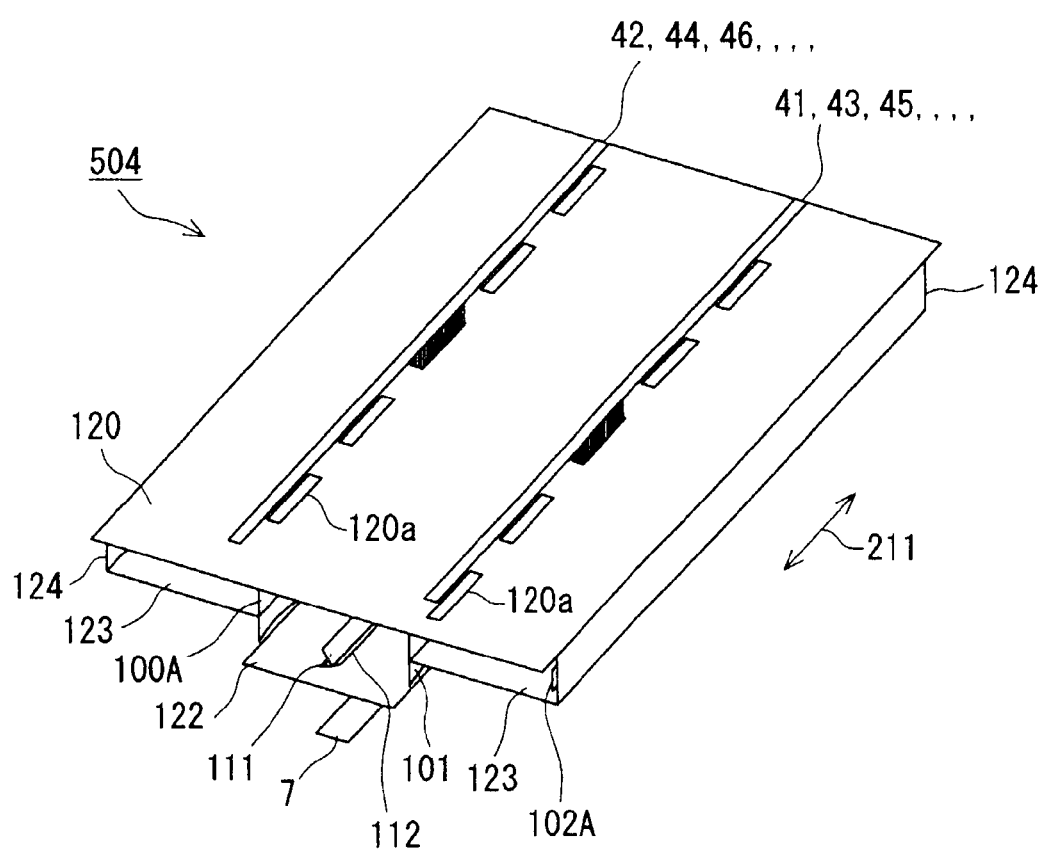
FIG. 18 is a perspective view illustrating a structure of the image reading apparatus shown in FIG. 14 and illustrating the apparatus of FIG. 17 seen from the back side.

For this problem, on the light shielding slit 122 having aperture regions 122a, it is preferable to arrange the aperture regions 122a in a zigzag manner. When the light shielding members 123 and 124 shield the light path subsequent to the aperture 101 from the outside light, the resistance to the stray light can be further improved. Further, the light shielding slit 120 may be arranged to the optical path section subsequent to the third bending mirror 113, so that the resistance to the stray light can be further more improved. In order to allow easy understanding of the structure of the light shielding slit 120, FIG. 18 shows the light shielding slit 120 in such a manner that the image reading apparatus 504 is vertically flipped from FIG. 17. The light shielding slit 120 is arranged with light beam-passing aperture sections 120a corresponding to the image pickup device units 41, 42, 43, . . . .

The aperture 101 may be transparent type, and as shown in FIG. 14, a shield wall 121 may be arranged between the adjacent cells within the same row, so that each of the optics system subsequent to the aperture 101 becomes an independent shielded chamber. This configuration is quite effective for preventing the stray light. In other words, the stray light does not exist except for the stray light passing through the small aperture section of the aperture 101. In addition, when the color of the inner wall surfaces of the shield walls 121, the light shielding members 123 and 124, and the like is black, the stray light can be more effectively prevented.

In order to achieve the above imaging optics system, a method of using one member as optical members in the same row can be considered. For example, concave mirrors corresponding to the first concave mirrors 100A and the second concave mirrors 102A may be arranged with an interval of 18 mm to form a lens array, and an aperture array made of one plate having aperture holes with an interval of 18 mm may be used as the aperture 101. A reflective member such as aluminum may be evaporated onto one elongated plate, so as to serve as the first bending mirror 111, the second bending mirror 112, and the third bending mirror 113. Since the first bending mirror 111 and the second bending mirror 112 are arranged adjacent to each other, for example, an equivalent may be made by evaporating a reflective member onto both inclined surfaces of a roof-shaped form having a triangular cross section.

In the fourth embodiment, an advanced form of the second embodiment is explained. More specifically, in the fourth embodiment, the light beams which are directed from the document 7 to the cells among the chief rays of the cells 11, 13, . . . in the first row 215 and the cells 12, 14, . . . in the second row 216 are not in parallel with each other. However, it is to be understood that the above-described structure using the concave mirrors and the bending mirrors in the fourth embodiment can also be easily applied to the image reading apparatus 501 according to the first embodiment.

Fifth Embodiment

Figure 19:
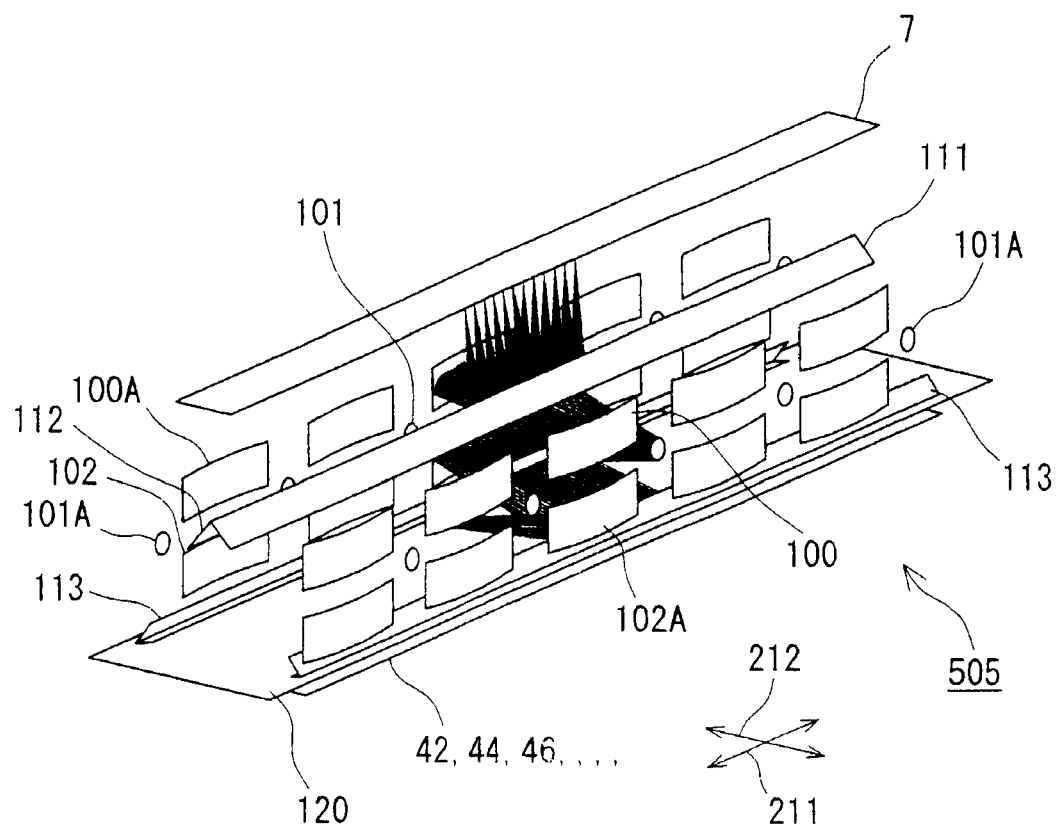
FIG. 19 is a perspective view illustrating a structure of an image reading apparatus according to the fifth embodiment of the present invention.
Figure 20:
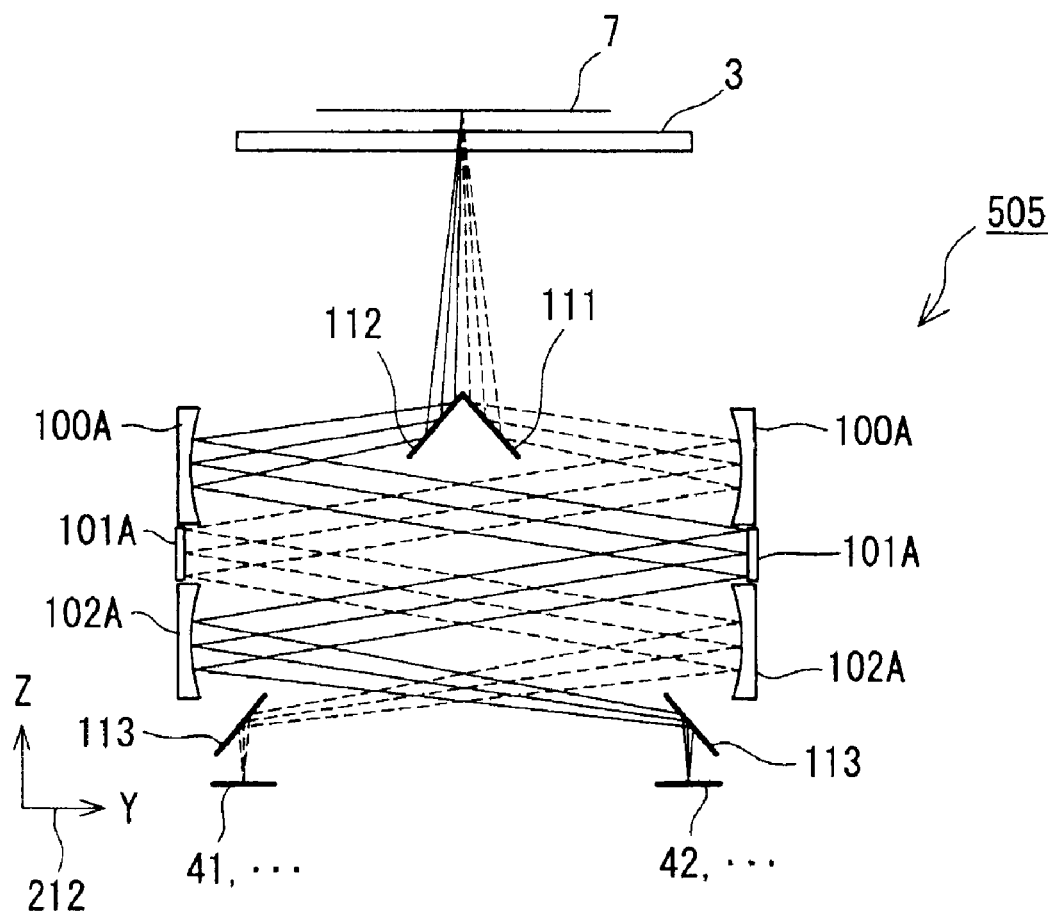
FIG. 20 is a perspective view in the sub-scanning direction illustrating a structure of the image reading apparatus shown in FIG. 19.
Figure 21:
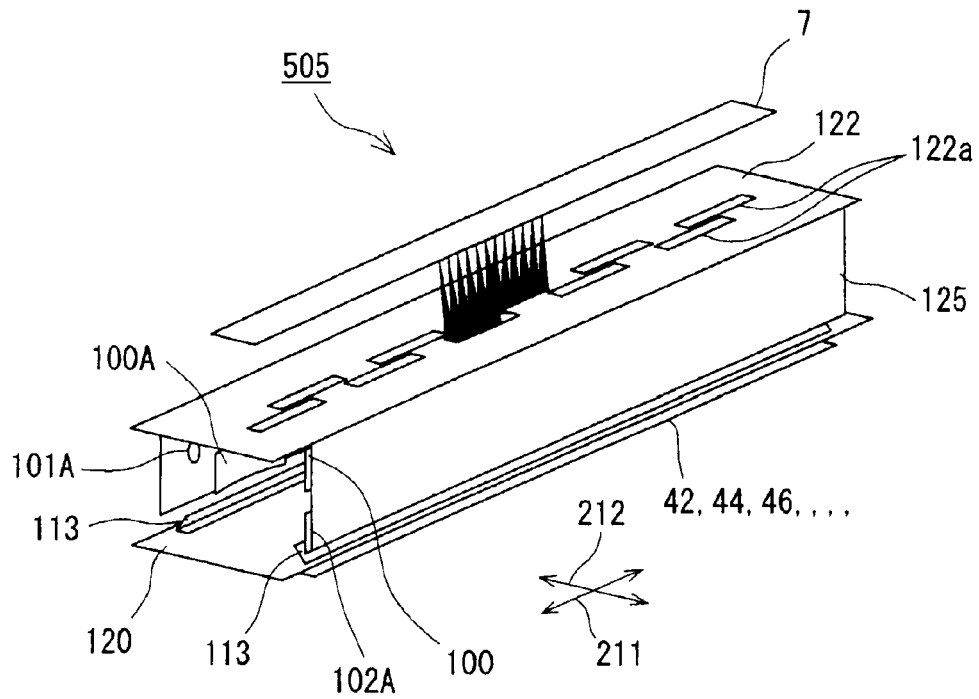
FIG. 21 is a perspective view illustrating a structure of the image reading apparatus shown in FIG. 19.

An example of an image reading apparatus 505 according to the fifth embodiment of the present invention will be explained with reference to FIG. 19 to FIG. 21. FIG. 19 illustrates an internal structure of a reading optics system portion of the image reading apparatus 505. However, FIG. 19 does not show the illumination light source 2, the top panel 3, the image pickup device substrate 4, the memory 5, the processor 6, and the like for the sake of simplicity of illustration. FIG. 20 is a perspective view illustrating an optical path in the sub-scanning direction 212 in such a manner that the main scanning direction 211 is perpendicular to the sheet plane of FIG. 20. FIG. 21 shows an optics system unit attached with a light shielding member in addition to what is shown in FIG. 19.

The image reading apparatus 505 according to the fifth embodiment has the same structure as the image reading apparatus 504 according to the fourth embodiment except for the differences explained below. Therefore, a detailed description thereabout is omitted here. Since the image reading apparatus 505 has the same structure as the image reading apparatus 504, the image reading apparatus 505 basically achieves the same effects as the image reading apparatus 504 as described above.

The difference between the image reading apparatus 504 according to the fourth embodiment and the image reading apparatus 505 according to the fifth embodiment is as follows. In the fourth embodiment, the aperture 101 has the transparent aperture section. In the present embodiment, a reflective mirror is formed to correspond to the above aperture section. A periphery of the reflective region of the above reflective mirror is made with a black member that shields light. As described above, the above reflective mirror according to the fifth embodiment performs the same function as the aperture 101 explained in the first to fourth embodiments, but the reflective mirror has a different form. In the below explanation, a reflective mirror 101A is assumed to be an example of element corresponding to the aperture 101 and performing the functions of a diaphragm.

The optical paths will be explained with reference to FIG. 20. In FIG. 20, optical paths indicated by dashed lines relate to the cells 11, 13, . . . of the first row 215, and optical paths indicated by solid lines relate to the cells 12, 14, . . . of the first row 216. The optical path (dashed line) relating to the first row 215 is reflected by the first bending mirror 111 to the right side of the figure, and is collimated by the first concave mirror 100A. Then, the optical path reaches the reflective mirror 101A installed on the left side of the figure. The black member absorbs the light reaching the outside of the reflective region having a diameter of ϕ1 mm on the reflective mirror 101A. The light beam reflected by the reflective region of the reflective mirror 101A is condensed by the second concave mirror 102A installed on the right side of the figure. Thereafter, the light beam is reflected by the third bending mirror 113 installed on the left side of the figure and forms an image on each of the image pickup device units 41, . . . . The entire optics system is arranged with the light shielding slit 122 and the light shielding member 125 as shown in FIG. 21 in order to shield the stray light from the outside.

The obtained image is the same as the one obtained in the fourth embodiment. Accordingly, explanation about the effects thereof is omitted. In the below explanation, only the difference from the fourth embodiment will be explained.

The portion corresponding to the aperture section of the aperture 101 in the fourth embodiment is made by the reflective mirror in the fifth embodiment. Therefore, the size of the optics system can be reduced in the sub-scanning direction 212. Specifically, numerical values will be explained. In the fourth embodiment, the interval between the optical elements in the sub-scanning direction 212 is about 60 mm. In the fifth embodiment, the interval between the optical elements in the sub-scanning direction 212 is about 20 mm. Therefore, the interval is reduced to about one third.

Further, this fifth embodiment also has the transfer magnification of 1:1. Therefore, as shown in FIG. 20, the first concave mirror 100A and the second concave mirror 102A included in the optics system of the first row 215 and the reflective mirror 101A included in the optics system of the second row 216 can be arranged on the same plane along the main scanning direction 211. Likewise, the first concave mirror 100A, the second concave mirror 102A, and the reflective mirror 101A included in the optics system of the second row 216 can be arranged on the same plane.

With this configuration, a two-dimensional lens array including the first concave mirror 100A and the second concave mirror 102A is formed with a resin mold. Therefore, there is an effect in that a highly-accurate optics system can be easily assembled. In addition, the aperture 101 is used, and a mirror-finished reflective member is attached to the aperture section, and the section other than the aperture section is made with a black member. Therefore, there is also an effect in that a reflective mirror array can be made easily made by just placing plates having aperture sections in an array form. In addition, in this case, there is also an effect in that the aperture 101 used in the first to fourth embodiments can be used.

Sixth Embodiment

Figure 22:
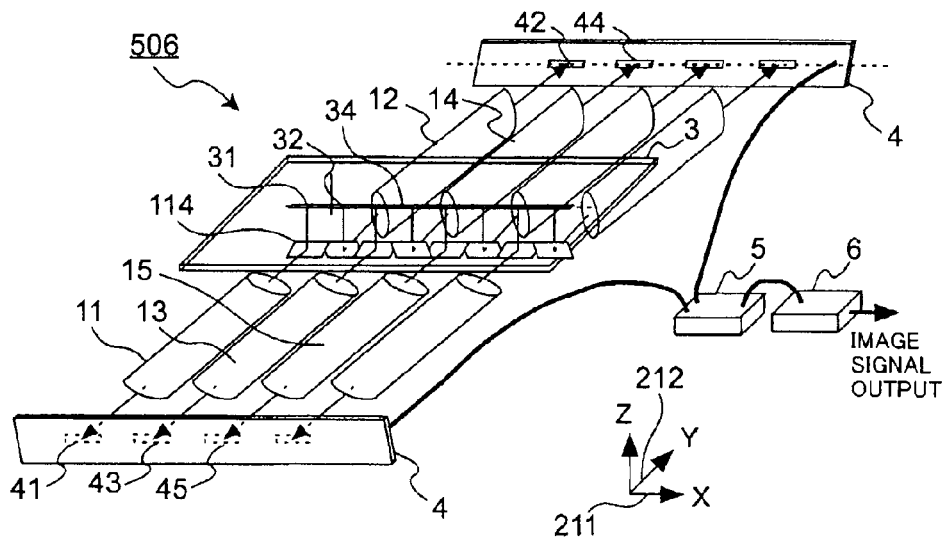
FIG. 22 is a perspective view illustrating an image reading apparatus according to the sixth embodiment of the present invention.
Figure 23:
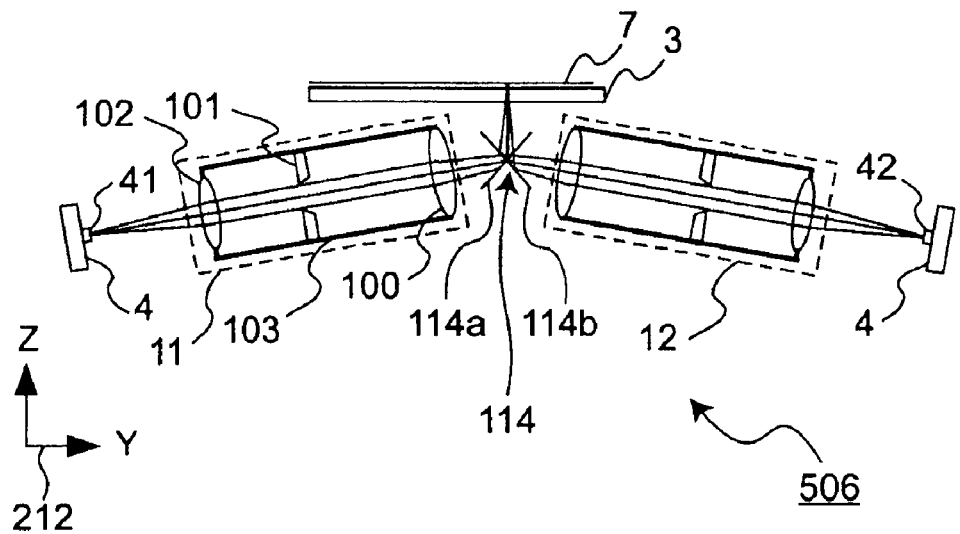
FIG. 23 is a perspective view in the sub-scanning direction illustrating a structure of the image reading apparatus shown in FIG. 22.

An example of an image reading apparatus 506 according to the sixth embodiment of the present invention will be explained with reference to FIG. 22 to FIG. 23. FIG. 22 does not show the illumination light source 2 and the document 7 for the sake of simplicity of illustration.

The image reading apparatus 506 according to the sixth embodiment corresponds to a variation of the image reading apparatus 503 according to the third embodiment. That is, the image reading apparatus 503 according to the third embodiment includes two mirrors, i.e., the first bending mirror 111 and the second bending mirror 112, arranged separately in the sub-scanning direction 212 as shown in FIG. 13. Therefore, the two reading lines 8 and 9 are arranged on the document surface. In contrast, the image reading apparatus 506 according to the sixth embodiment has one bending mirror 114. Therefore, on the document surface, the sections 31, 32, 33, . . . are arranged in the main scanning direction 211, and there is only one reading line.

This bending mirror 114 extends along the main scanning direction 211, and is formed with a first reflective surface 114a for bending the light reflected by the document 7 to the cells 11, 13, . . . of the first row 215 and a second reflective surface 114b for bending the light reflected by the document 7 to the cells 12, 14, . . . of the second row 216. The first reflective surface 114a and the second reflective surface 114b are formed to correspond to the cells 11, 13, . . . and the cells 12, 14, . . . . That is, a direction of the first reflective surface 114a and that of the second reflective surface 114b are alternately different for each adjacent cell.

Figure 13:
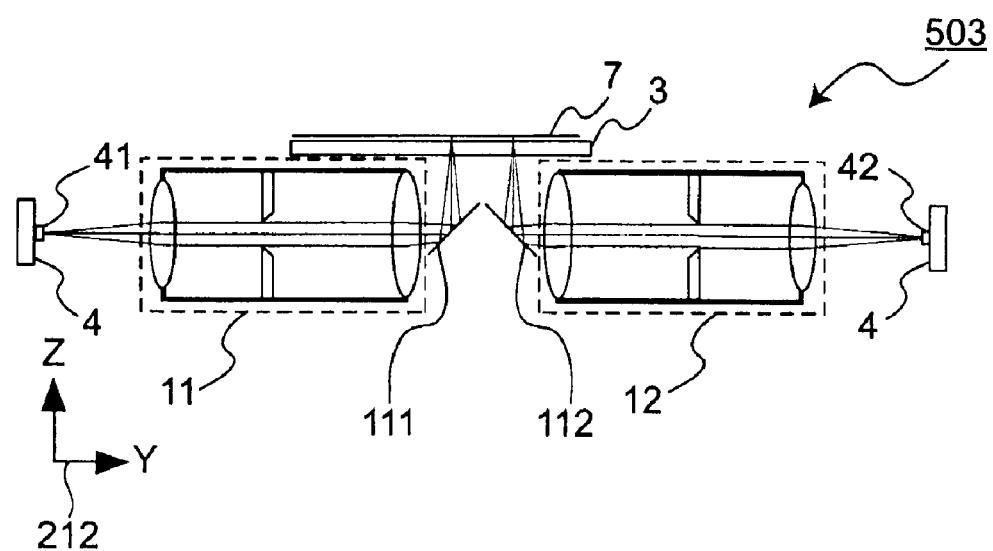
FIG. 13 is a perspective view in the sub-scanning direction illustrating a structure of an image reading apparatus according to the third embodiment of the present inventions.

As shown in FIG. 13, in the image reading apparatus 503 according to the third embodiment, the cells 11, 13, . . . and the cells 12, 14, . . . are arranged in parallel with respect to the top panel 3. In contrast, in the image reading apparatus 506 according to the sixth embodiment, the cells 11, 13, . . . and the cells 12, 14, . . . are arranged slightly inclined with respect to the top panel 3.

The structure of the image reading apparatus 503 according to the third embodiment and the structure of the image reading apparatus 506 according to the sixth embodiment are not different except for the above-described two differences. Therefore, the structure of the image reading apparatus 506 is not explained in detail here. The above-described effects achieved by the image reading apparatus 503 according to the third embodiment can also be achieved by the image reading apparatus 506 according to the sixth embodiment.

The operation of the above bending mirror 114 will be explained with reference to FIG. 24.

A pitch between adjacent cells is denoted with C. The bending mirror 114 is arranged in the main scanning direction 211 without any gap. A pitch between the first reflective surface 114a and the second reflective surface 114b is also C.

Figure 24:
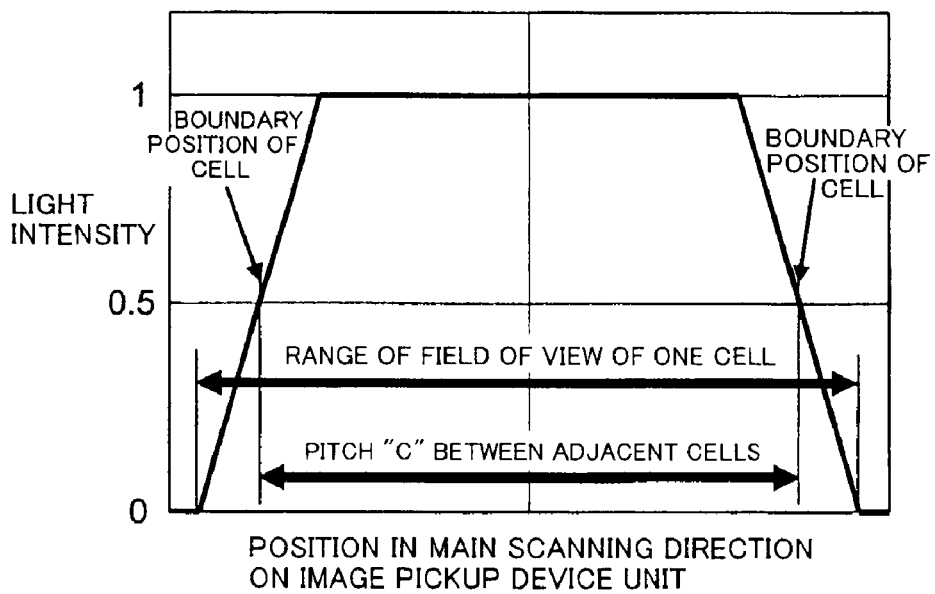
FIG. 24 is a view illustrating a distribution of light quantity on a surface of the image pickup device in a range of field of view of one cell of the image reading apparatus shown in FIG. 22.

When attention is given to a certain cell, the range of the field of view thereof is larger than C, but the amount of light thereof decreases with the approach to the ends of the field of view as shown in FIG. 24. At near the boundary between the cells, each cell forms an image while dividing the intensity of light between the adjacent cells. A summation of the intensities of lights of the images thus divided and formed is 1. For example, at a boundary position right between the cells, the amount of light is divided into two between the adjacent cells, and accordingly, the intensity of light is 0.5 compared to the intensity of light in a central region of a cell. When the images are combined, it is possible to use each image in a region in which the field of view overlaps with each other between the adjacent cells. The method for combining the images is the same as the method described in the explanation about the first embodiment.

The first to fifth embodiments are different from the sixth embodiment in that the intensities of lights of images overlapped between the adjacent cells do not decrease.

In the sixth embodiment, the telecentric optics system is arranged at the side of the document, and among the chief rays, all the light beams directed from the document 7 to the cells are perpendicular to the top panel 3. Accordingly, even when the position of the document 7 is displaced in the focus direction, the reading positions of the cells 11, 13, . . . of the first row 215 and the cells 12, 14, . . . of the second row 216 are not displaced, and the transfer magnification does not change. Therefore, there is an effect in that a large depth of focus can be obtained.

In addition, the images on the sections 31, 32, . . . in one reading line are combined, and therefore, there is an effect in that the capacity of the memory 5 can be small.

Seventh Embodiment

Figure 25:
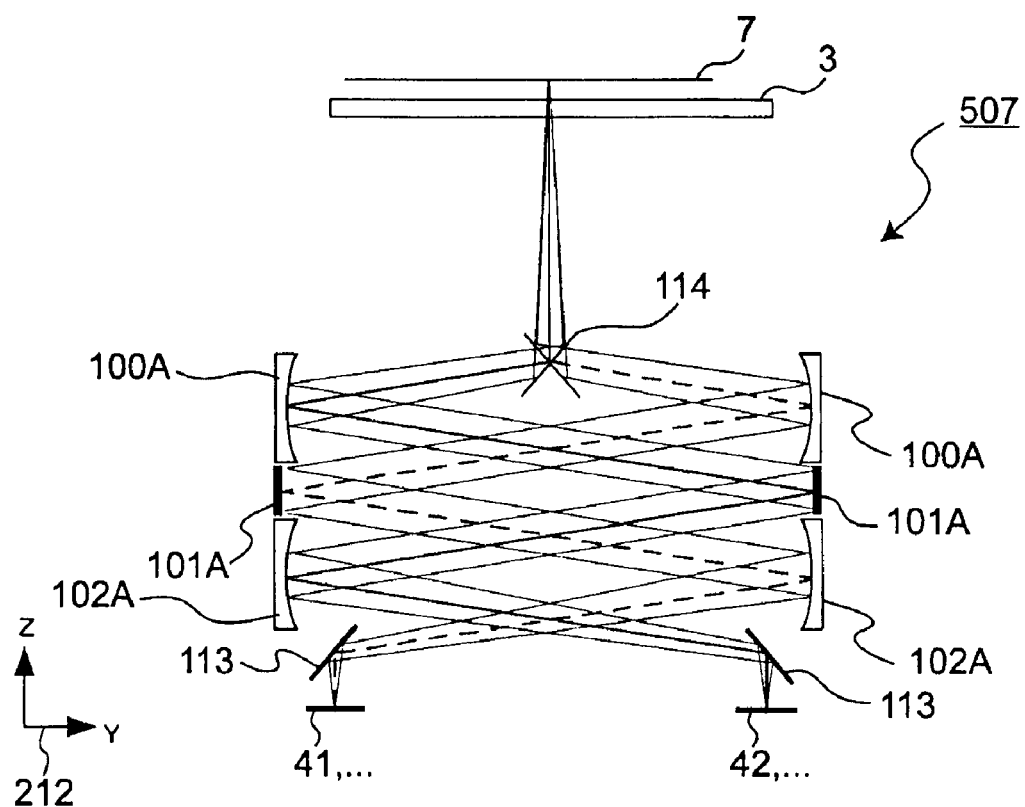
FIG. 25 is a perspective view in the sub-scanning direction illustrating a structure of an image reading apparatus according to the seventh embodiment of the present invention.

An example of an image reading apparatus 507 according to the seventh embodiment of the present invention will be explained with reference to FIG. 25.

The image reading apparatus 507 basically employs the structure of the image reading apparatus 505 according to the fifth embodiment. The image reading apparatus 507 is configured such that one bending mirror 114 employed in the sixth embodiment is used in place of the first bending mirror 111 and the second bending mirror 112 of the image reading apparatus 505.

The above image reading apparatus 507 can achieve not only the above effects achieved by the image reading apparatus 505 according to the fifth embodiment but also the effects achieved by the image reading apparatus 506 according to the sixth embodiment.

Alternatively, a configuration combining the above-described first to seventh embodiments may be formed.

Subsequently, the actual signal processing performed by the processor 6 will be explained using the image reading apparatus 507 according to the seventh embodiment as an example. It should be noted that this signal processing operation is applicable to the image reading apparatus according to all of the above-explained first to seventh embodiments. In the below explanation, the length, in the main scanning direction 211, of the document read by one cell, for example, the cell 11, is assumed to be 6 mm. As shown in FIG. 27, the image pickup device units 41, 42, . . . having a resolution of 600 dpi includes 144 pixels per one cell in the main scanning direction 211. In other words, 144 light receiving parts 402 are arranged.

Figure 30:
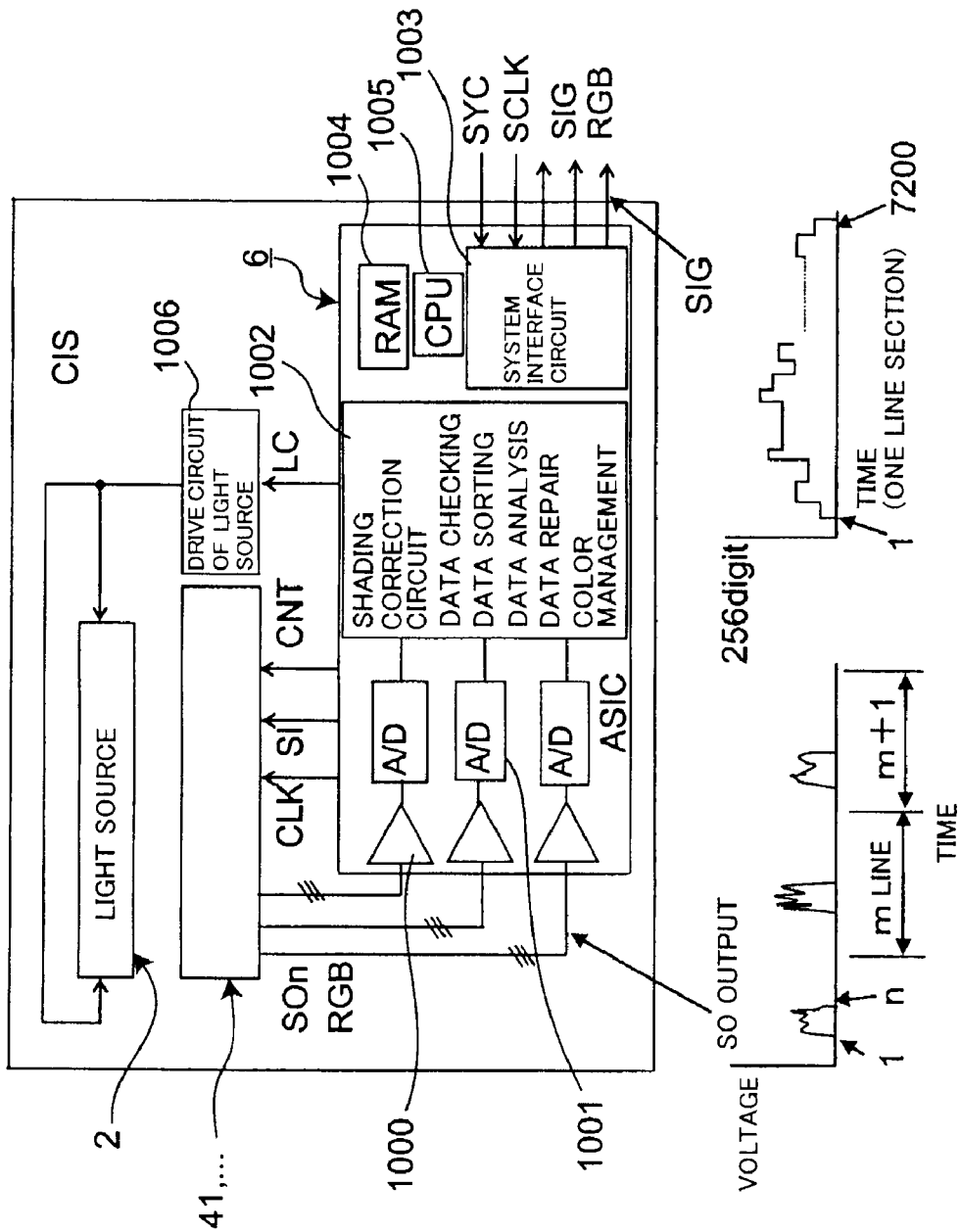
FIG. 30 is a block diagram illustrating a structure of a processor of the image reading apparatus according to the first to seventh embodiments.

FIG. 30 shows the flow of signals between the light source 2, the image pickup device units 41, . . . , a drive circuit of light source 1006, and the processor 6 of the image reading apparatus 507 according to the seventh embodiment. The processor 6 is supplied with image signals obtained from the image pickup device units 41, . . . . The processor 6 controls the operation of the image pickup device units 41, . . . and the drive circuit of light source 1006, and inputs and outputs signals to and from the system main body including the image reading apparatus 507.

The processor 6 includes amplifiers 1000 for amplifying signals obtained from the photoelectric conversion by the image pickup device units 41, . . . , analog/digital converters (A/D converters) 1001 for performing analog-to-digital conversion on the amplified output of the photoelectric conversion, a signal processing unit 1002 for performing signal processing on the digital output of each color of RGB, a system interface 1003 for exchanging signals between the system main body and the processor 6, and a RAM 1004 for storing image information of each color, and a CPU 1005.

Subsequently, the operation of the processor 6 will be explained.

Figure 31:
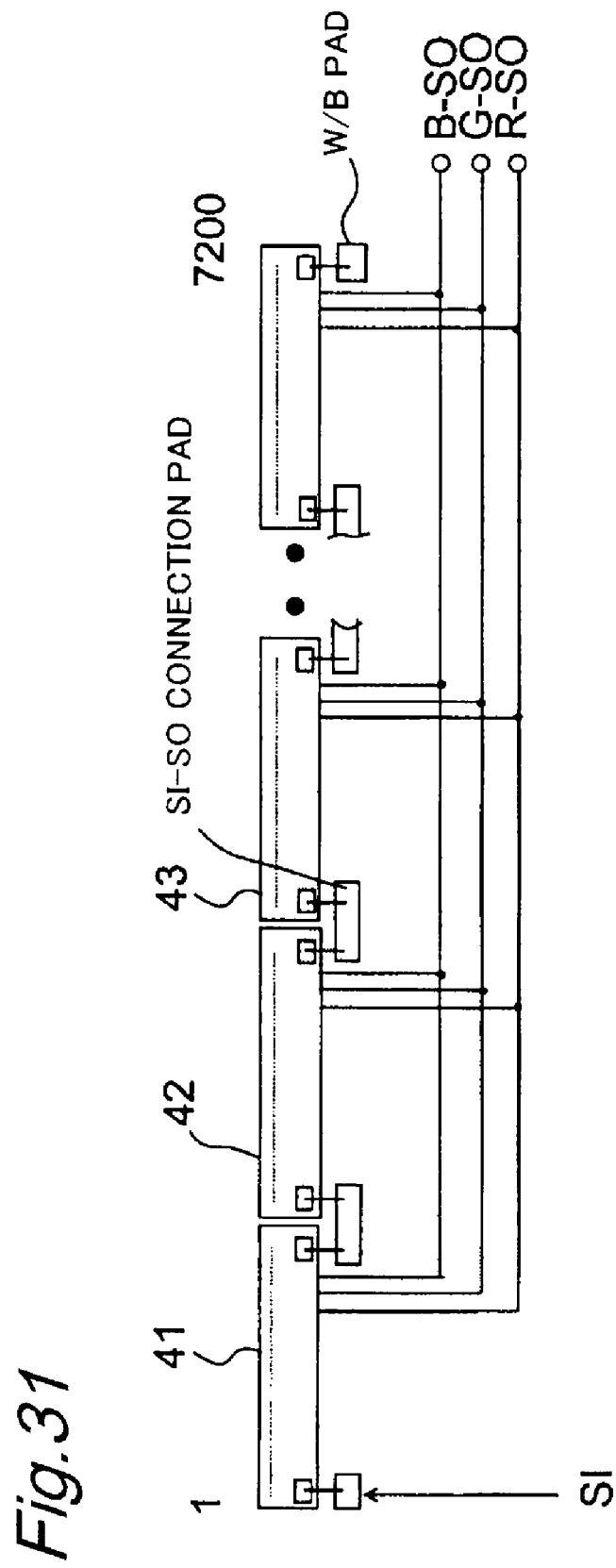
FIG. 31 is a connection diagram of image pickup device units of the image reading apparatus according to the first to seventh embodiments.
Figure 32:
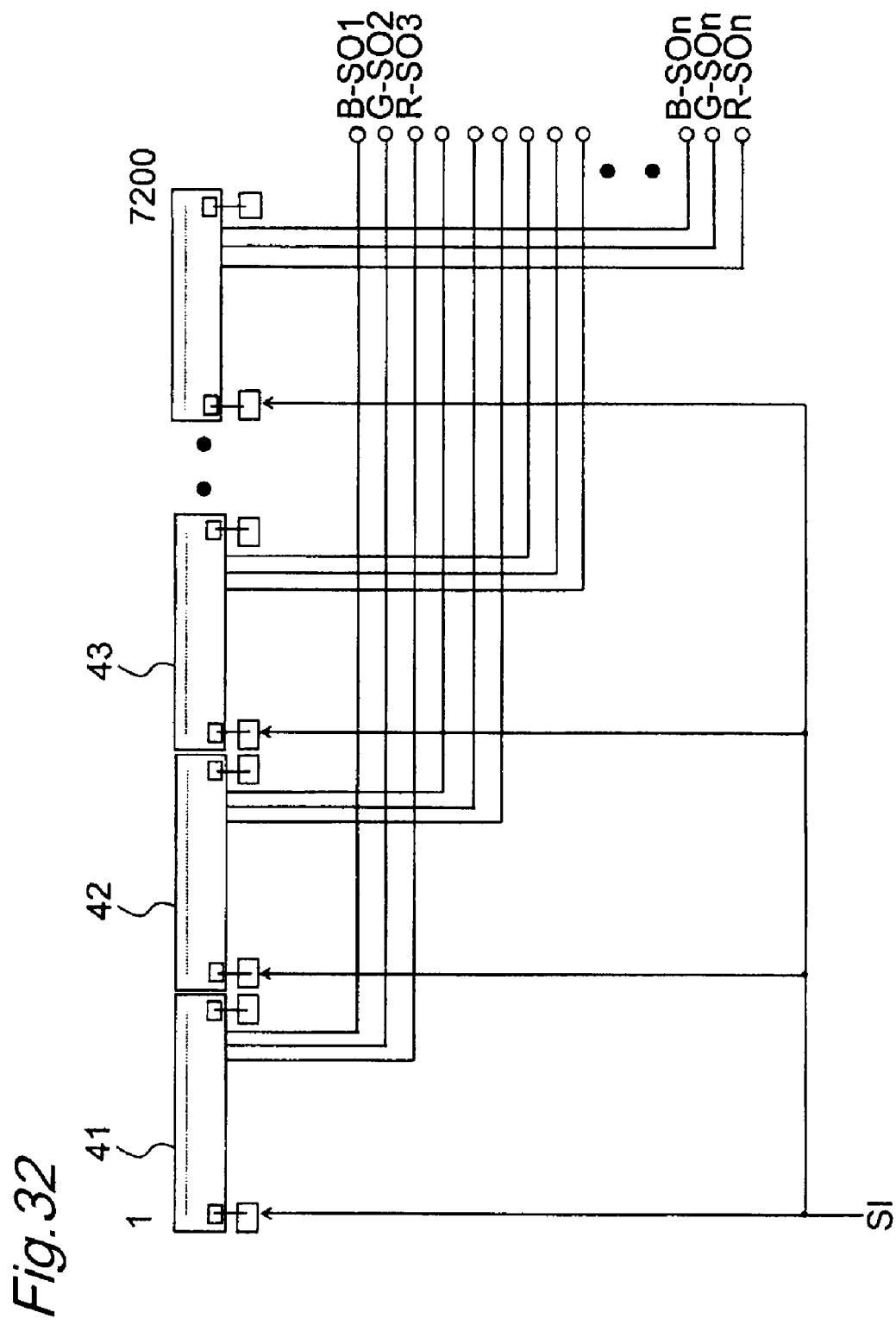
FIG. 32 is a connection diagram of another example of image pickup device units of the image reading apparatus according to the first to seventh embodiments.

As shown in FIG. 30, based on a system control signal (SYC) and a system clock signal (SCLK) signal provided by the system main body, the processor 6 outputs a clock signal (CLK) for the processor 6 and a start signal (S1) synchronized with the clock signal to the image pickup device units 41, . . . , by way of the system interface 1003. Continuous analog signals of pixels (n) are output from the image pickup device units 41, . . . to the processing circuit 6 for each reading line (m) according to the timing of the above clock signal and the start signal. In the example of FIG. 31, the above analog signals of 7200 pixels are sequentially output. In the example of divided output in FIG. 32, 144 pixels are output as one unit.

The above analog signals of pixels provided by the image pickup device units 41, . . . and amplified by the amplifiers 1000 are converted by the A/D converters 1001 into digital signals. After the A/D conversion, the signal outputs of the pixels (bits) are processed by a correction circuit in the signal processing unit 1002 for performing the shading correction and all bits correction.

These correction processing are performed by reading correction data from the RAM 1004, and uses the correction data to calculate and process the A/D-converted digital signals corresponding to image information. It should be noted that the correction data are prepared by performing equalization processing of data which are read by using a reference test chart such as a white document and the like in advance. The correction data are used to correct unevenness of the light emission sources 27 and unevenness of the sensitivities of the element sections of the image pickup device units 41, . . . .

The above series of operation is performed under the control of the CPU 1005.

Figure 33:
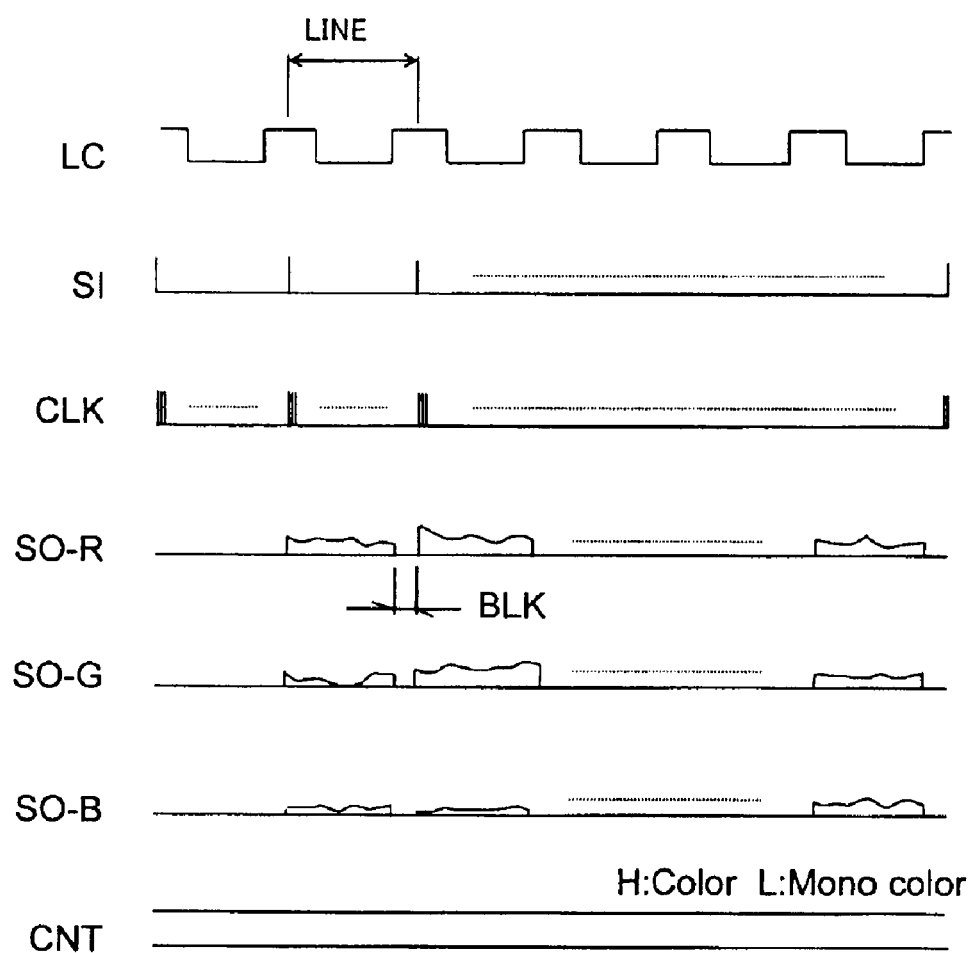
FIG. 33 is a timing chart explaining operation of the processor of the image reading apparatus according to the first to seventh embodiments.

Subsequently, the timing of the signal processings will be explained using FIG. 27, FIG. 30, and FIG. 33. In FIG. 30 and FIG. 33, the processor 6 turns on a light source lighting signal (LC) in synchronization with the CPU 1005. When the light source lighting signal is provided, the drive circuit of light source 1006 provides a power supply to the light emission sources 27 for a predetermined period of time, and accordingly, the RGB light emission source 27 emits white light.

In synchronization with the continuous CLK signal, the start signal (SI) sequentially turns on the outputs of shift registers of elements (pixels) included in the drive circuit of photoelectric conversion and RGB shift registers 403 of the image pickup device units 41, . . . . When the corresponding switches sequentially turn on and off the SIG (SO) lines, RGB image information (image output) can be obtained in synchronization with the CLK signal. This image output is an output of each image read and accumulated in a previous line. It should be noted that a CNT is a color/monochrome switch signal, and normally is at a high level in the color mode. In each color reading section of one line, a BLK (blanking) time is set so as to vary the setting of the exposure time. Therefore, in the BLK section, all the SIGs (SO) are opened.

Figure 34:
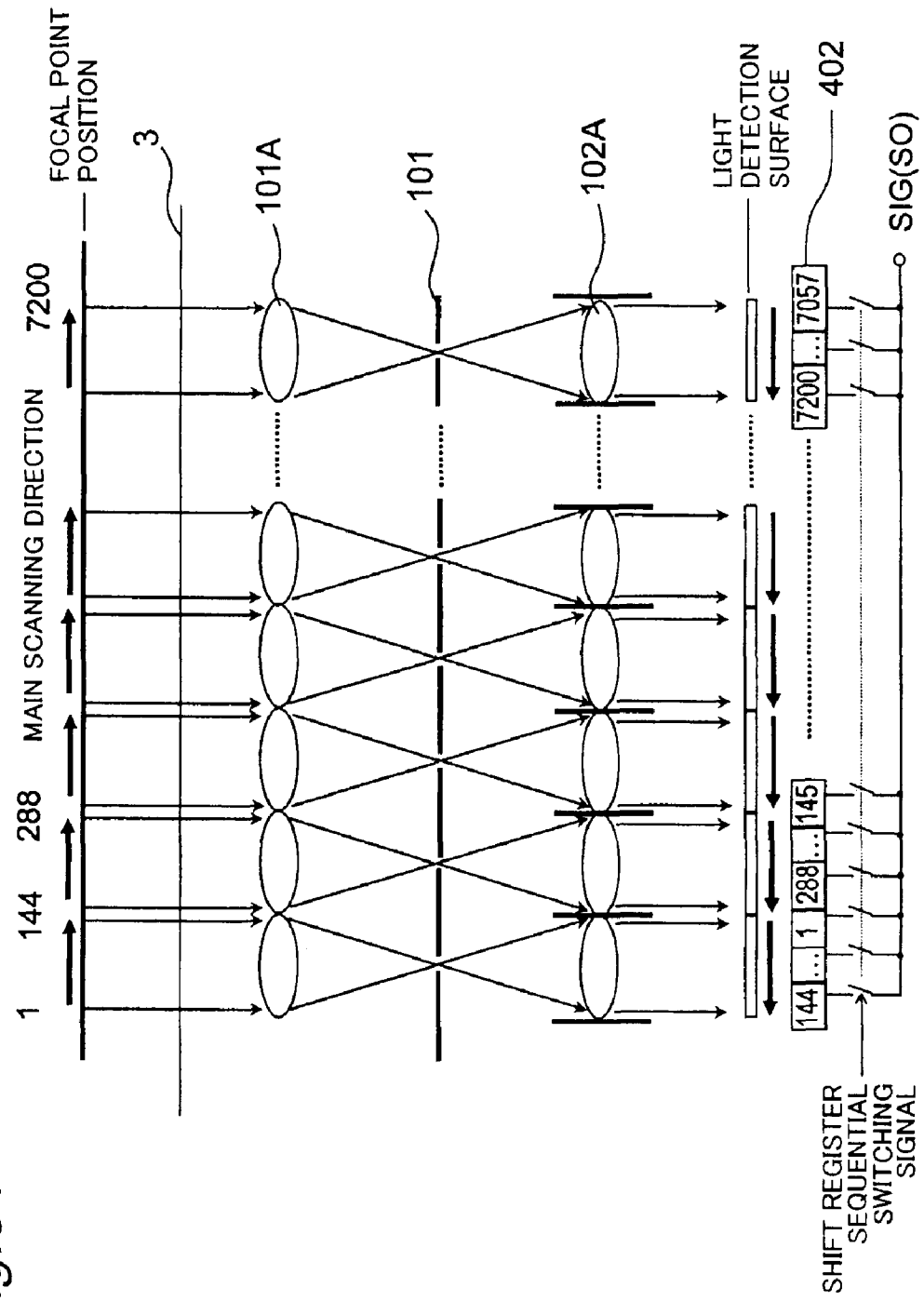
FIG. 34 is a view explaining operation of the processor of the image reading apparatus according to the first to seventh embodiments.

FIG. 34 shows the image signal SIG (SO) sequentially output. The shift registers are included in the drive circuit of photoelectric conversion and RGB shift registers 403 of the image pickup device units 41, . . . , and output the SIG (SO) signal as analog signals with three series, i.e., unit of RGB, at a time sequentially according to the switching signals.

Figure 35:
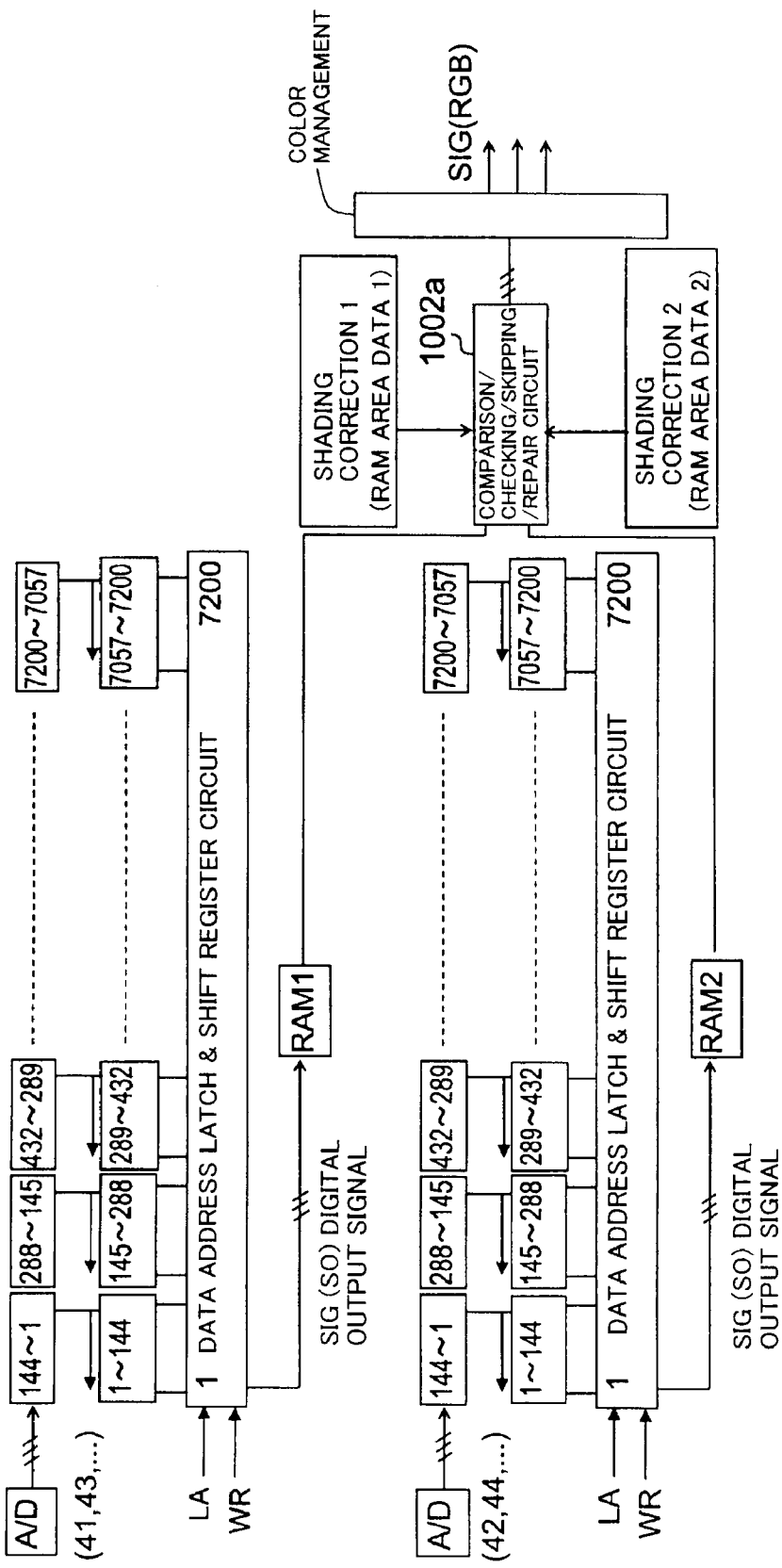
FIG. 35 is a view explaining operation of the processor of the image reading apparatus according to the first to seventh embodiments, and explaining sorting of reversed image data and signal processing.

FIG. 35 is a view illustrating sorting and signal processing of reversed image data of RGB signals having been subjected to A/D conversion. In FIG. 35, data are sorted every 144 bits, and thereafter, the signal processing is performed.

In FIG. 35, each of RGB (SO) signals having been subjected to A/D conversion is shifted to left by a shift register circuit included in the signal processing unit 1002. Then, each of the RGB (SO) signals is stored to a respective storage unit made by a shift register circuit, and is latched (LA) therein. The latched data are sequentially sorted as SIG (SO) from the first storage unit of the image pickup device units 41, . . . upon a write signal (WR), and are stored in the RAM 1004. As described above, the image data stored in the RAM 1004 are subjected to correction and calculation processing by the signal processing unit 1002. The image reading apparatus 507 according to the seventh embodiment processes both of the signals output by the two rows of the image pickup device units 41, 43, . . . and the image pickup device units 42, 44, . . . . Therefore, in the above correction and calculation processing, each of the image data is further subjected to signal processing by a comparison/checking/skipping/repair circuit 1002a of a subsequent stage shown in FIG. 35 included in the signal processing unit 1002.

Figure 36:
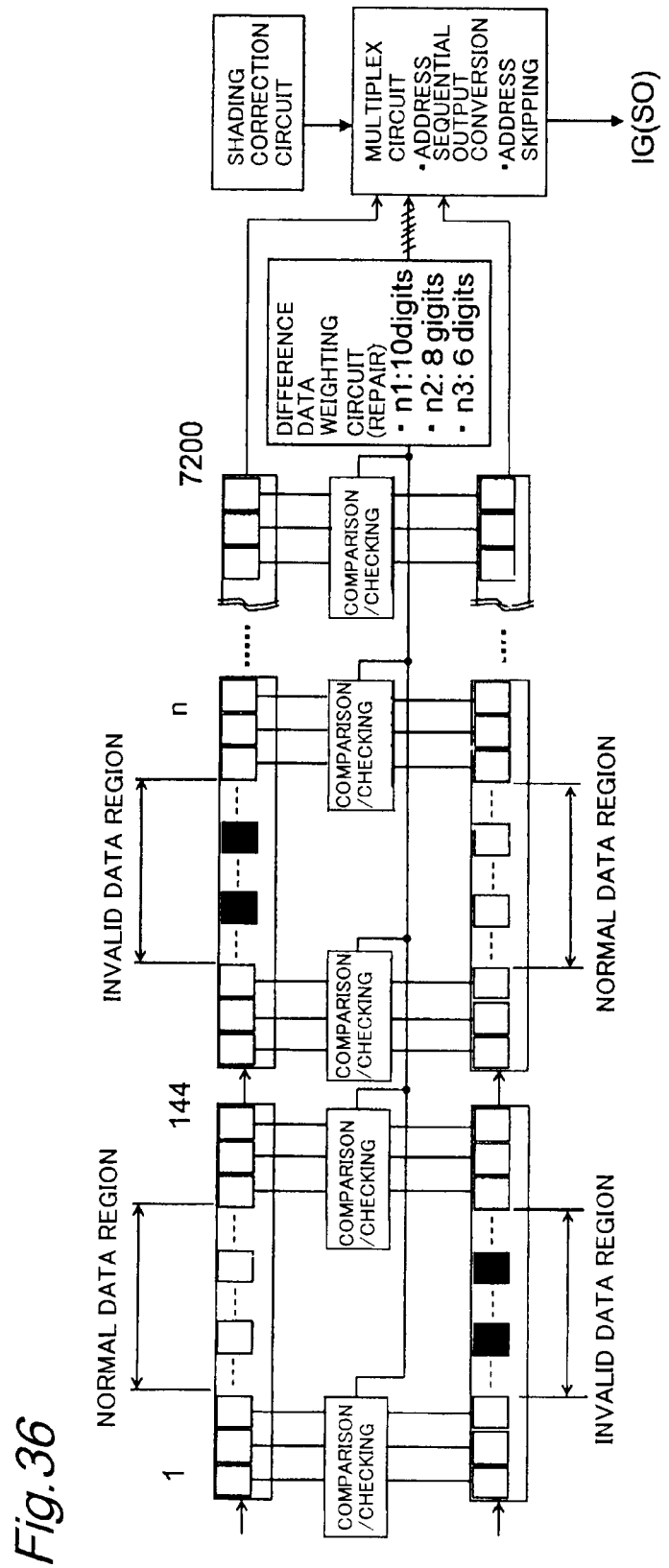
FIG. 36 is a view explaining operation of the processor of the image reading apparatus according to the first to seventh embodiments, and is a block diagram for illustrating a comparison/checking/skipping/repair circuit.

FIG. 36 is a block diagram showing a configuration of the comparison/checking/skipping/repair circuit 1002a.

After the reversed image data are sorted, image data provided by the image pickup device units 41, 43, . . . stored in a RAM 1 of the RAM 1004 and image data provided by the image pickup device units 42, 44, . . . stored in a RAM 2 of the RAM 1004 are sequentially output and supplied to the shift registers. Accordingly, as shown in FIG. 36, the data in the RAM 1 and the RAM 2 corresponding to a boundary region between the image pickup device units are compared and checked. In other words, since the optical path is reversed in the sub-scanning direction 212 in the adjacent image pickup device unit, the comparison/checking processing is executed in order to improve the ghost in the main scanning direction 211 caused by, e.g., a gap between an array of image pickup device units on one row and an array of image pickup device units on the other row, and the reflection of the slight unnecessary light on the shielding plate.

After comparing information about both pixels at a position corresponding to respective shift registers, a difference is obtained, and a weight is applied to the output of image data. The weights are applied such that a larger weight is given to data of a pixel located on the outermost side, and that a smaller weight is given to data of a pixel located on the inner side. In a pixel region located on the inner side, an optical region with normal reflecting light in one row is adopted as normal data, and an optical region with non-normal reflecting light in the other row is adopted as invalid data. These data are output upon being subjected to address conversion by a multiplexer circuit.

The image data having thus been subjected to the correction and calculation processing are output as SIG (RGB) color data via the system interface 1003 by using a color conversion and color management engine and the like in a color management system including data analysis and data recovery.

The above-described various embodiments may be combined to make an embodiment. In such case, the combined embodiment can achieve the effect of each of them.

The present invention has been sufficiently described in relation to exemplary embodiments with reference to the attached drawings. However, it is obvious for people skilled in the art to make various modifications and changes. It is to be understood that the present invention includes such modifications and changes as long as the changes and the modifications do not deviate from the scope of the present invention defined in the attached claims.

INDUSTRIAL APPLICABILITY

The present invention can be applied to an image reading apparatus used for a copier and the like and a banknote reading apparatus.

The invention claimed is:
1. An image reading apparatus comprising:
a light source configured to apply light to a section to be imaged of a document;
an imaging optics system configured to form an image upon condensing scattered light of the light reflected by the section, the imaging optics system including a plurality of cells which are arranged in a main scanning direction, each of which is independent from each other and includes a telecentric optics system at the side of the document,
wherein the cells are arranged in a sub-scanning direction in two rows of a first row and a second row, and are arranged such that light beams among chief rays of the cells arranged in a same row, light beams being directed from the document to the cells, are in parallel with each other, and
wherein the cells in the first row and the second row are arranged zigzag in the main scanning direction so as to complement a formed image by the cells in the sub-scanning direction;
a plurality of image pickup device units arranged to correspond to the respective cells;
a memory configured to store image information transmitted from image pickup device units corresponding in the sub-scanning direction;
a processor configured to create a document image by combining images obtained from neighboring cells in the sub-scanning direction so that images in overlapped areas of the neighboring cells in the sub-scanning direction match with each other; and
a light shielding member inserted between the cells in the main scanning direction.

2. The image reading apparatus according to claim 1, wherein the cells arranged in the first row and the second row are arranged such that the light beams among the chief rays of the cells arranged in the first row, light beams being directed from the document to the cells, and the light beams among the chief rays of the cells arranged in the second row, light beams being directed from the document to the cells, are inclined toward a gap side between the first row and the second row.

3. The image reading apparatus according to claim 1, further comprising a bending mirror arranged between the document and the cell so as to bend an optical path of the scattered light incident to the cell.

4. The image reading apparatus according to claim 3, wherein the bending mirror includes a first bending mirror corresponding to the cells in the first row and a second bending mirror corresponding to the cells in the second row, the first bending mirror and the second bending mirror being arranged along the main scanning direction at different positions in the sub-scanning direction.

5. The image reading apparatus according to claim 3, wherein the bending mirror includes a first reflective surface corresponding to the cells in the first row and a second reflective surface corresponding to the cells in the second row, the first reflective surface and the second reflective surface being arranged along the main scanning direction at one position in the sub-scanning direction.

6. The image reading apparatus according to claim 3, wherein the cell includes a first optical element into which the scattered light enters from the document and a second optical element which outputs light to the image pickup device unit, at least one of the first optical element and the second optical element being a reflective light-gathering element.

7. The image reading apparatus according to claim 6, wherein the cell further includes a diaphragm which is arranged at a back focal point position of the first optical element and causes the cell to be a telecentric optics system at the side of the document, a light-transmitting region of the diaphragm being made of a mirror.

8. The image reading apparatus according to claim 3, wherein a transfer magnification of each cell is 1.

9. The image reading apparatus according to claim 1, wherein the cell includes a first optical element into which the scattered light enters from the document and a second optical element which outputs light to the image pickup device unit, at least one of the first optical element and the second optical element being a reflective light-gathering element.

10. The image reading apparatus according to claim 9, wherein the cell further includes a diaphragm which is arranged at a back focal point position of the first optical element and causes the cell to be a telecentric optics system at the side of the document, a light-transmitting region of the diaphragm being made of a mirror.

11. The image reading apparatus according to claim 1, wherein a transfer magnification of each cell is 1.

* * * * *